United States Patent
Kwak et al.

(10) Patent No.: US 7,899,009 B2
(45) Date of Patent: Mar. 1, 2011

(54) METHOD AND APPARATUS FOR SCHEDULING UPLINK RATES ADAPTIVELY TO FAST RATE RAMPING IN A PACKET COMMUNICATION SYSTEM

(75) Inventors: Yong-Jun Kwak, Yongin-si (KR); Ju-Ho Lee, Suwon-si (KR); Sung-Ho Choi, Suwon-si (KR); Hwan-Joon Kwon, Gyeonggi-do (KR); Young-Bum Kim, Seoul (KR); Youn-Hyoung Heo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1313 days.

(21) Appl. No.: 10/956,926

(22) Filed: Oct. 1, 2004

(65) Prior Publication Data

US 2005/0117519 A1    Jun. 2, 2005

(30) Foreign Application Priority Data

Oct. 2, 2003    (KR) ...................... 10-2003-0068954

(51) Int. Cl.
*H04W 4/00* (2009.01)
*H04W 72/00* (2009.01)
*H04L 12/56* (2006.01)
(52) U.S. Cl. .................. 370/329; 370/395.4; 455/452.2
(58) Field of Classification Search ................ 370/310, 370/236, 329, 395.4; 455/452.2
See application file for complete search history.

(56) References Cited

U.S. PATENT DOCUMENTS

| | | | | |
|---|---|---|---|---|
| 6,421,331 | B1 * | 7/2002 | Hulbert | 370/335 |
| 2002/0172217 | A1 * | 11/2002 | Kadaba et al. | 370/443 |
| 2002/0176362 | A1 * | 11/2002 | Yun et al. | 370/236 |
| 2003/0039267 | A1 * | 2/2003 | Koo et al. | 370/465 |

FOREIGN PATENT DOCUMENTS

| | | |
|---|---|---|
| EP | 1 067 729 | 1/2001 |
| EP | 1 231 807 | 8/2002 |
| EP | 1 478 136 | 11/2004 |
| KR | 10-2002-0076652 | 10/2002 |
| WO | WO 02/063781 | 8/2002 |
| WO | WO 2005/018115 | 2/2005 |

* cited by examiner

*Primary Examiner*—George Eng
*Assistant Examiner*—Christopher M Brandt
(74) *Attorney, Agent, or Firm*—The Farrell Law Firm, P.C.

(57) ABSTRACT

A method and apparatus for efficiently controlling uplink traffic rates, performing scheduling accompanied by fast rate ramping, and transmitting uplink rate assignment information in an asynchronous WCDMA communication system. A Node B determines an allowed current rate for an uplink channel. If the difference between the current rate and the previous rate is two or more levels, the Node B transmits a rate indication indicating the current rate. If the difference between the current rate and the previous rate is zero or one level, the Node B transmits a rate up/down indicating a rate change from the previous rate to the current rate. Also the Node B may transmit the rate indication instead of the rate up/down, periodically or in an event-triggered manner.

46 Claims, 15 Drawing Sheets

METHOD AND APPARATUS FOR SCHEDULING UPLINK RATES ADAPTIVELY TO FAST RATE RAMPING IN A PACKET COMMUNICATION SYSTEM

PRIORITY

This application claims priority under 35 U.S.C. §119 to an application entitled "Method and Apparatus for Scheduling Uplink Rates Adaptively to Fast Rate Ramping in a Packet Communication System" filed in the Korean Intellectual Property Office on Oct. 2, 2003 and assigned Serial No. 2003-68954, the contents of which are hereby incorporated by reference.

BACKGROUND OF THE INVENTION

1. Field of the Invention

The present invention relates generally to asynchronous WCDMA (Wideband Code Division Multiple Access) communications, and in particular, to a method and an apparatus for efficiently controlling uplink (UL) traffic rates, performing UL rate scheduling accompanied by fast rate ramping, and transmitting rate assignment information.

2. Description of the Related Art

UMTS (Universal Mobile Telecommunication Service), one of the $3^{rd}$ generation mobile communication systems implements WCDMA, based on the European mobile communication system, GSM (Global System for Mobile communication). The UMTS system provides a uniform service that transmits packetized text, digital voice and video, and multimedia data at or above 2 Mbps to mobile subscribers or computer users around the world. With the introduction of the concept of virtual access, UMTS allows access to any end point in a network all the time. The virtual access refers to packet-switched access using a packet protocol like IP (Internet Protocol).

FIG. 1 illustrates the configuration of a UTRAN (UMTS Terrestrial Radio Access Network).

Referring to FIG. 1, a UTRAN 12 comprises RNCs (Radio Network Controllers) 16a and 16b and a plurality of Node Bs 18a, 18b, 18c and 18d. The UTRAN 12 connects a UE 20 to a core network (CN) 10. A plurality of cells may underlie the Node Bs 18a to 18d. The RNC 16a controls the Node Bs 18a and 18b, and the RNC 16b controls the Node Bs 18c and 18d. The Node Bs 18a to 18d in turn control their underlying cells. An RNC, and Node Bs and cells under the control of the RNC are collectively called an RNS (Radio Network Subsystem).

The RNCs 16a and 16b assign or manage the radio resources of the Node Bs 18a to 18d within their coverage areas. The Node Bs 18a to 18d provide radio resources. Radio resources are configured on a cell basis, and the radio resources provided by the Node Bs 18a to 18d are those of their managed cells. The UE 20 establishes a radio channel using radio resources provided by a particular cell under a particular Node B and communicates on the radio channel. From the UE's perspective, discrimination between a Node B and a cell is meaningless. The UE 20 only recognizes physical channels established on a cell basis. Therefore, the terms Node B and cell are interchangeably used herein.

A Uu interface is defined between a UE and an RNC. The hierarchical protocol architecture of the Uu interface is illustrated in detail in FIG. 2. The Uu interface is divided into a control plane (C-plane) for exchanging control signals between the UE and the RNC and a user plane (U-plane) for transmitting actual data.

Referring to FIG. 2, C-plane signaling 30 is processed through an RRC (Radio Resource Control) layer 34, an RLC (Radio Link Control) layer 40, a MAC (Medium Access Control) layer 42, and a PHY (PHYsical) layer 44. U-plane information 32 is processed through a PDCP (Packet Data Control Protocol) layer 36, a BMC (Broadcast/Multicast Control) layer 38, the RLC layer 40, the MAC layer 42, and the PHY layer 44. The PHY layer 44 is defined in each cell, and the MAC layer 42 through the RRC layer 34 are defined in each RNC.

The PHY layer 44 provides an information delivery service using radio transfer technology. The information delivery service corresponds to layer 1 (L1) in an OSI (Open Systems Interconnection) model. The PHY layer 44 is connected to the MAC layer 42 via transport channels. The mapping relationship between the transport channels and physical channels is determined according to how data is processed in the PHY layer 44.

The MAC layer 42 and the RLC layer 40 of layer 2 (L2) are connected via logical channels. The MAC layer 42 delivers data received from the RLC layer 40 on logical channels to the PHY layer 44 on appropriate transport channels. It also delivers data received from the PHY layer 44 on transport channels to the RLC layer 40 on appropriate logical channels. The MAC layer 42 inserts additional information into the data received on logical channels or transport channels or performs an appropriate operation by interpreting inserted additional information, and controls the random access. While separately not shown, a U-plane-related part of the MAC layer 42 is referred to as a MAC_d and its C-plane-related part is referred to as a MAC-c.

The RLC layer 40 controls the establishment and release of the logical channels. The RLC layer 40 operates in one of an acknowledged mode (AM), an unacknowledged mode (UM), and a transparent mode (TM). Typically, the RLC layer 40 segments or concatenates SDUs (Service Data Units) received from an upper layer to an appropriate size and corrects errors.

The PDCP layer 36 is an upper layer of the RLC layer 40 on the U-plane. The PDCP layer 36 is responsible for compression and decompression of the header of the data in the form of an IP packet, and also controls the lossless data delivery when a change in an RNC providing service to a particular UE occurs due to the UE's mobility.

The characteristics of the transport channels that connect the PHY layer 44 to the upper layers depend on TF (Transport Format) that defines PHY layer processing involving convolutional channel encoding, interleaving, and service-specific rate matching.

The UMTS system uses an E-DCH or EUDCH (Enhanced Uplink Dedicated Channel) to more efficiently transmit packet data from UEs on the UL. To support high-speed data transmission more stably than a DCH (Dedicated Channel) used for general data transmission, the E-DCH adopts AMC (Adaptive Modulation and Coding), HARQ (Hybrid Automatic Retransmission request), and Node B controlled scheduling.

FIG. 3 conceptually illustrates data transmission on the E-DCH via radio links. Referring to FIG. 3, reference numeral 100 denotes a Node B supporting the E-DCH and reference numerals 101 to 104 denote UEs that transmit over the E-DCH. The Node B 100 detects the channel statuses of the UEs 101 to 104 using the E-DCH and schedules their UL data transmissions based on the channel statuses. The scheduling is performed such that a noise rise measurement does not exceed a target noise rise in the Node B, in order to increase the total system performance. Hence, the Node B 100 assigns a low data rate to the remote UE 104 and a high data rate to the nearby UE 101.

FIG. 4 is a diagram illustrating a signal flow for E-DCH transmission and reception. Referring to FIG. 4, a Node B and a UE establish an E-DCH in step 202. Step 202 involves the transmission of messages on dedicated transport channels. Then, the UE transmits scheduling information to the Node B in step 204. The scheduling information may contain UL channel information, that is, the transmit power and power margin of the UE, and the amount of buffered data to transmit to the Node B.

In step 206, the Node B monitors the scheduling information. When determining to allow the UE to transmit UL packets, the Node B transmits Scheduling Assignment information to the UE in step 208. The Scheduling Assignment information contains rate assignment information including an allowed data rate and timing.

The UE determines in step 210 the TF of the E-DCH based on the Scheduling Assignment information. In steps 212 and 214, the UE notifies at the same time the Node B of the TF and transmits UL packet data on the E-DCH. In step 216, the Node B determines if the TF information and the packet data have errors. In the presence of errors, the Node B transmits in NACK (Non-Acknowledgement) signal to the UE in step 218. In the absence of errors, the Node B transmits an ACK (Acknowledgement) signal to the UE in step 218. In the latter case, the packet data transmission is completed and thus the UE transmits new packet data to the Node B on the E-DCH. In the former case, the UE retransmits the same packet data to the Node B on the E-DCH.

Many scheduling methods are available for the above-described UL packet transmission. With reference to FIG. 5, one of the UL scheduling methods, rate scheduling will be described.

FIG. 5 illustrates the transmission of UL/DL (Uplink/Downlink) control information for rate scheduling, and UL rates controlled through the rate scheduling.

Referring to FIG. 5, a UE 304 transmits a Rate Request 308 and an E-DCH packet 310 to a Node B 302. The Node B 302 then generates and transmits a Rate Grant 306 indicating an allowed rate to the UE 304 after UL scheduling. Both the UE 304 and the Node B 302 are provided with a preset rate table. The rate table lists a plurality of available rates corresponding to their levels.

The UE 304 checks the amount of buffered UL data and an available power margin, and sends a rate up or rate down request for the E-DCH to the Node B 302 by the Rate Request 308. The Node B 302 determines whether to increase, decrease, or maintain the rate of the UE 304, taking into account rate requests from other UEs under the control of the Node B 302 as well as the rate request from the UE 304, and notifies the UE 304 of the determination result by the Rate Grant information 306.

More specifically, the UE 304 requests a rate up in an interval 312 by a Rate Request 314. Upon receipt of the Rate Request 314, the Node B 302 commands the UE 304 to increase its rate by a Rate Grant 318 in an interval 316, after scheduling. Thus, in an interval 322, the UE 304 transmits a UL packet at rate 11 one level higher than rate 10 used in an interval 320.

The above rate scheduling allows only a one-level rate change at a time. If the UE transmits data at a very low rate and wants to increase the rate by a plurality of levels, the Node B must transmit as many scheduling commands, for the rate increase. In this sense, the conventional rate scheduling is inflexible in rate change and causes a long time delay in achieving a desired rate by the UE.

SUMMARY OF THE INVENTION

An object of the present invention is to substantially solve at least the above problems and/or disadvantages and to provide at least the advantages below. Accordingly, an object of the present invention is to provide a UL scheduling method and apparatus for transmitting UL packets on the E-DCH in an asynchronous WCDMA communication system.

Another object of the present invention is to provide a method and apparatus for reducing a time delay in the rate scheduling of UL packets in an asynchronous WCDMA communication system.

A further object of the present invention is to provide a method and apparatus for scheduling UL packet transmissions to achieve fast rate ramping in an asynchronous WCDMA communication system.

The above objects are achieved by providing a method and apparatus for efficiently controlling uplink traffic rates, performing scheduling accompanied by fast rate ramping, and transmitting uplink rate assignment information in an asynchronous WCDMA communication system.

According to one aspect of the present invention, in a method of transmitting uplink rate assignment information to a UE in a Node B in a packet communication system that assigns uplink rates through Node B controlled scheduling, a Node B determines an allowed current rate for an uplink channel for a UE that is implementing an uplink packet data service and determines if a rate indication indicating the current rate can be transmitted in a current interval. If the rate indication can be transmitted in the current interval, the Node B compares the current rate with a previous rate of the uplink channel. If the difference between the current rate and the previous rate is two or more levels, the Node B transmit the rate indication to the UE. If the rate indication cannot be transmitted in the current interval, or if the difference between the current rate and the previous rate is zero or one level, the Node B transmits to the UE a rate up/down indicating a rate change from the previous rate to the current rate.

According to another aspect of the present invention, in a method of receiving uplink rate assignment information from a Node B in a UE in a packet communication system that assigns uplink rates through Node B controlled scheduling, the UE determines if a rate indication indicating a current uplink rate can be received in a current interval. If the rate indication can be received, the UE receives the rate indication and a UE ID from the Node B. If the UE ID is identical to the ID of the UE, the UE determines the current rate according to the rate set in the rate indication. If the rate indication cannot be received or the UE ID is different from the ID of the UE, the UE receives a rate up/down command from the Node B, changes a previous rate of the uplink channel by one level or maintains the previous rate according to the rate up/down, and determines the changed or maintained rate as the current rate of the uplink channel.

According to a further aspect of the present invention, in an apparatus for transmitting uplink rate assignment information to a UE in a Node B in a packet communication system that assigns uplink rates through Node B controlled scheduling, a transmission controller determines if a rate indication can be transmitted in a current interval. Here, the rate indication indicates an allowed current rate for an uplink channel for a UE that is implementing an uplink packet data service. A rate indication generator generates the rate indication, if the rate indication can be transmitted in the current interval. A first transmitter encodes the rate indication and transmits the coded rate indication. A rate up/down generator compares the current rate with a previous rate of the uplink channel and generates a rate up/down indicating a rate change from the previous rate to the current rate, if the rate indication cannot be transmitted in the current interval. A second transmitter encodes the rate up/down and transmits the coded rate up/down.

According to still another aspect of the present invention, in an apparatus for receiving uplink rate assignment information from a Node B in a UE in a packet communication system that assigns uplink rates through Node B controlled scheduling, a reception controller determines if a rate indication indicating a current uplink rate can be received in a current interval, a first receiver receives the rate indication and a UE ID from the Node B, if the rate indication can be received, a rate indication analyzer determines the current rate according to the rate set in the rate indication, a second receiver receives a rate up/down from the Node B, if the rate indication cannot be received or the UE ID is different from the ID of the UE, and a rate up/down analyzer changes a previous rate of the uplink channel by one level or maintains the previous rate according to the rate up/down and determines the changed or maintained rate as the current rate of the uplink channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
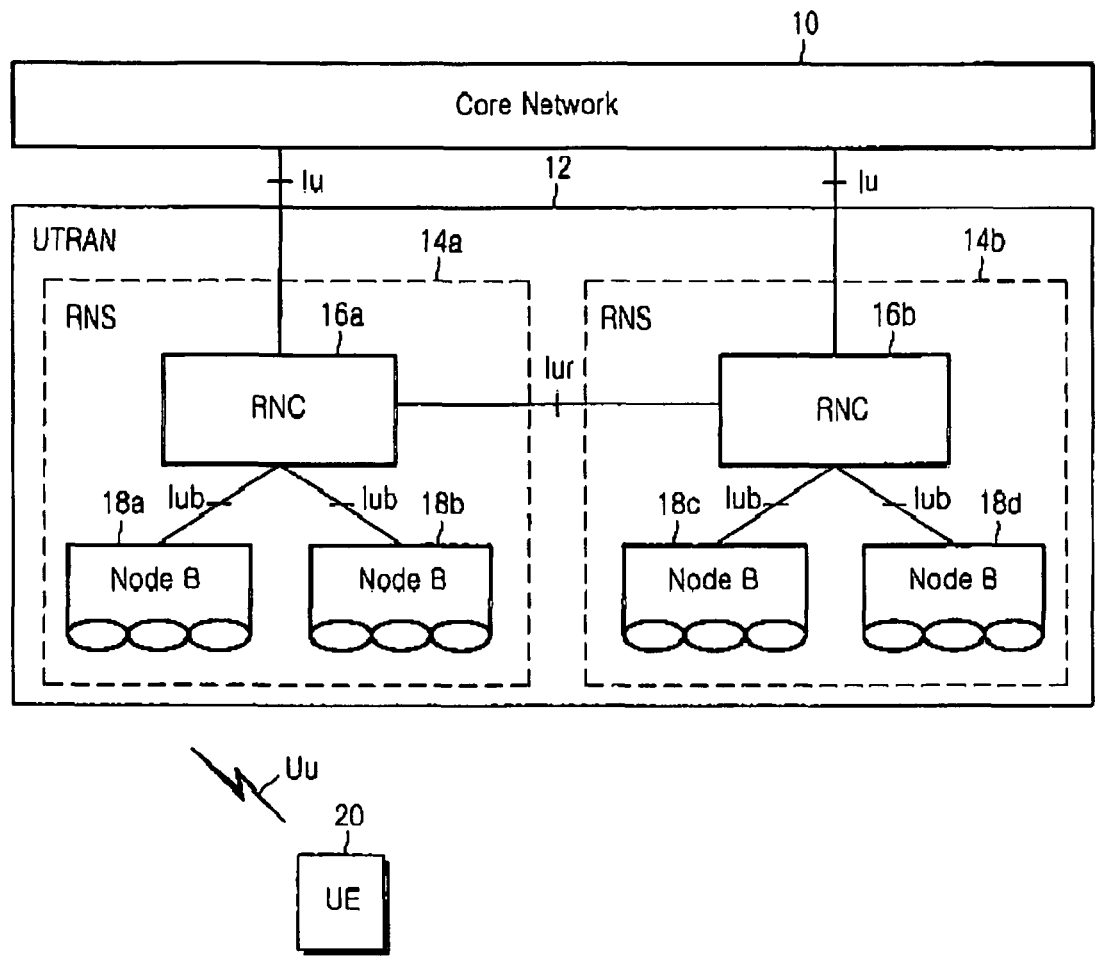
FIG. 1 illustrates the configuration of a UTRAN.
Figure 2:
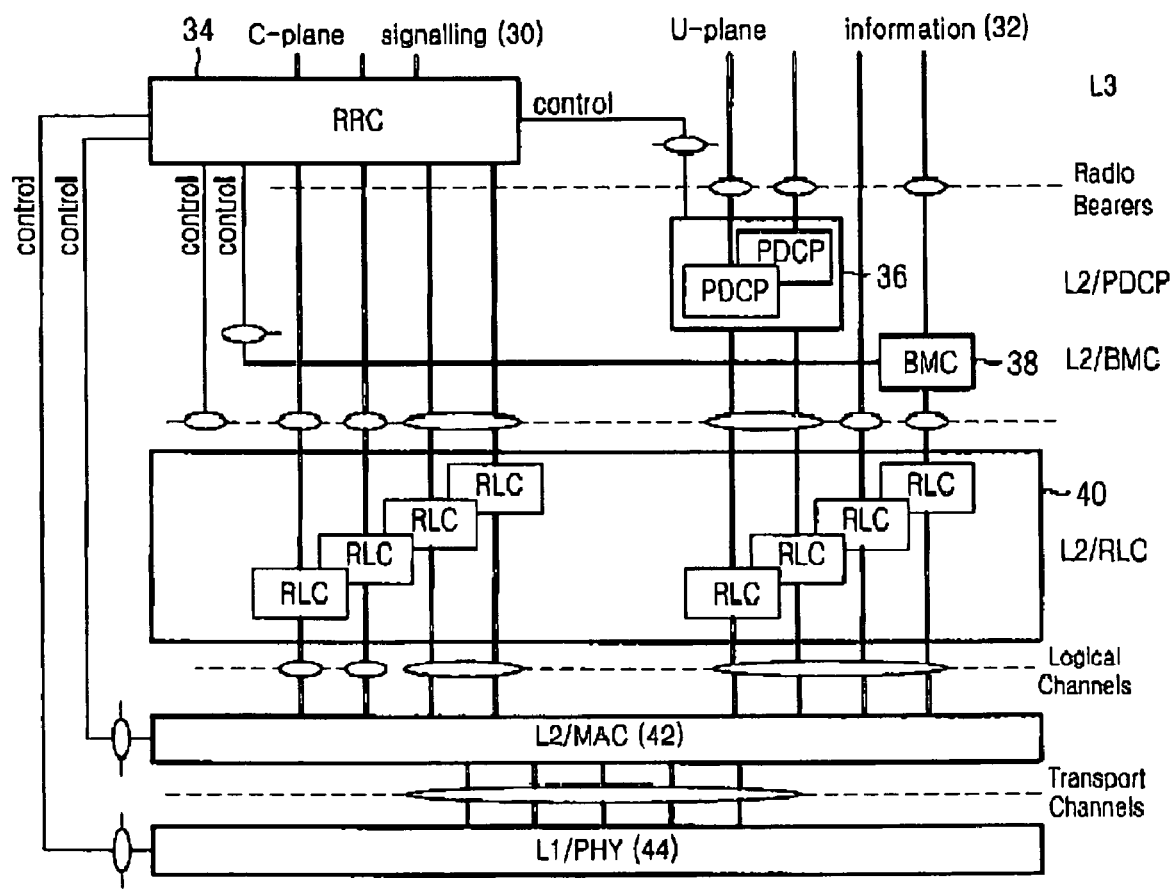
FIG. 2 illustrates the hierarchical protocol architecture of the interface between a UE and an RNC.
Figure 3:
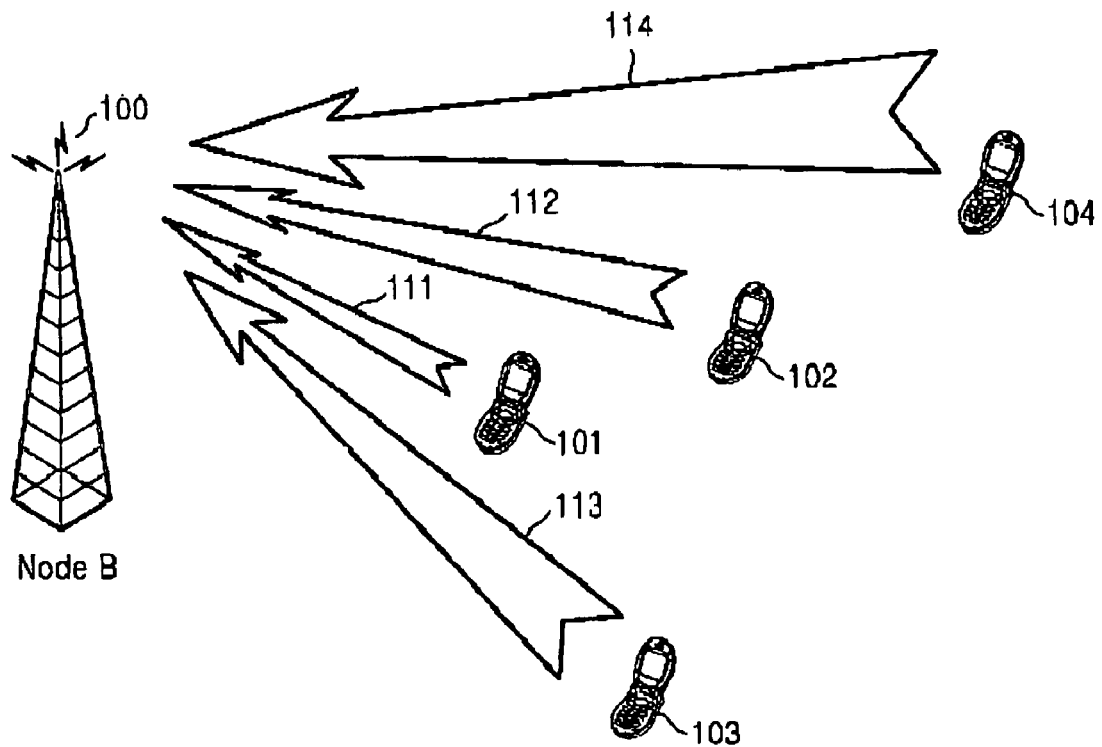
FIG. 3 conceptually illustrates a typical data transmission on the E-DCH via radio links.
Figure 4:
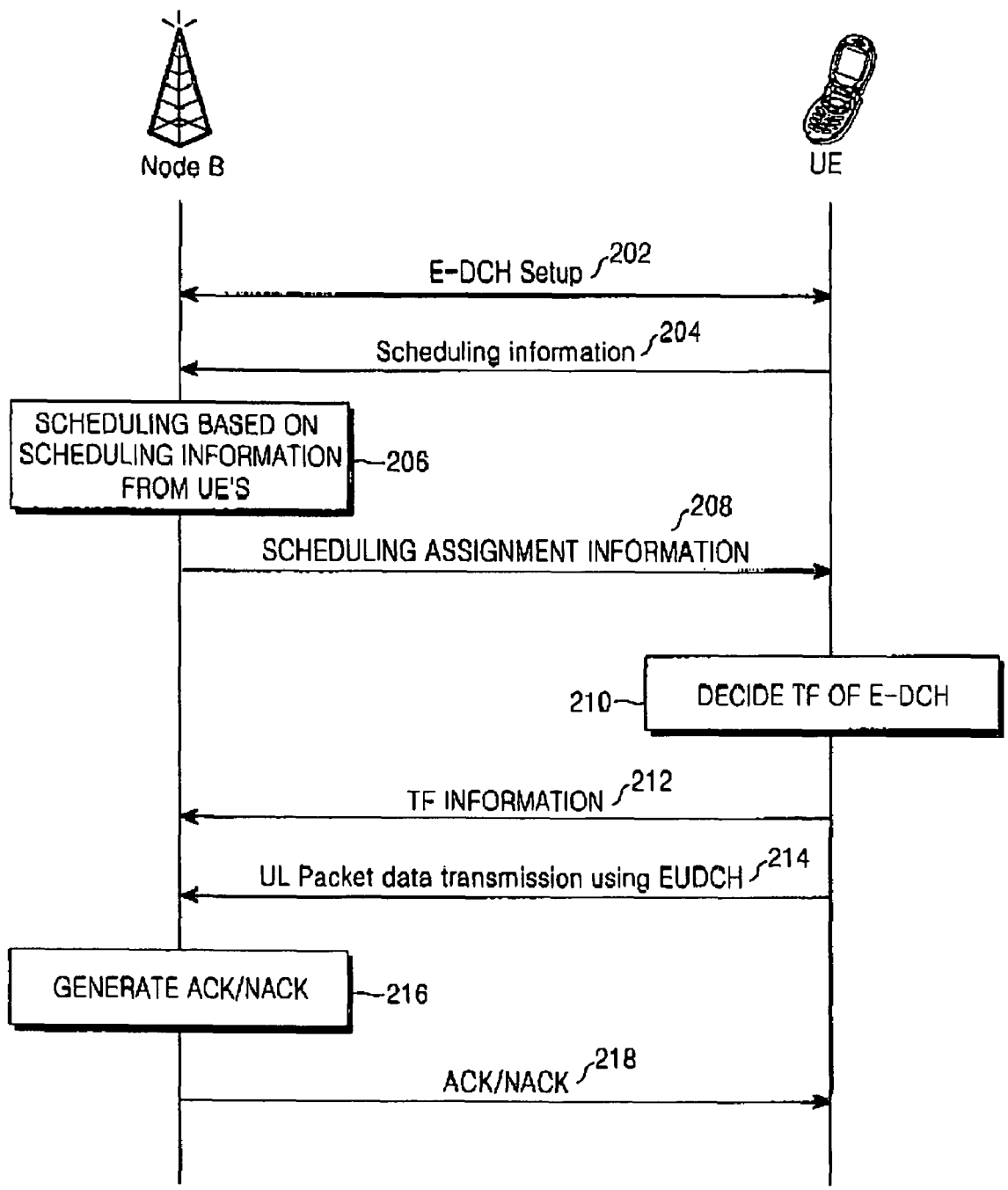
FIG. 4 is a diagram illustrating a signal flow for E-DCH transmission and reception.
Figure 5:
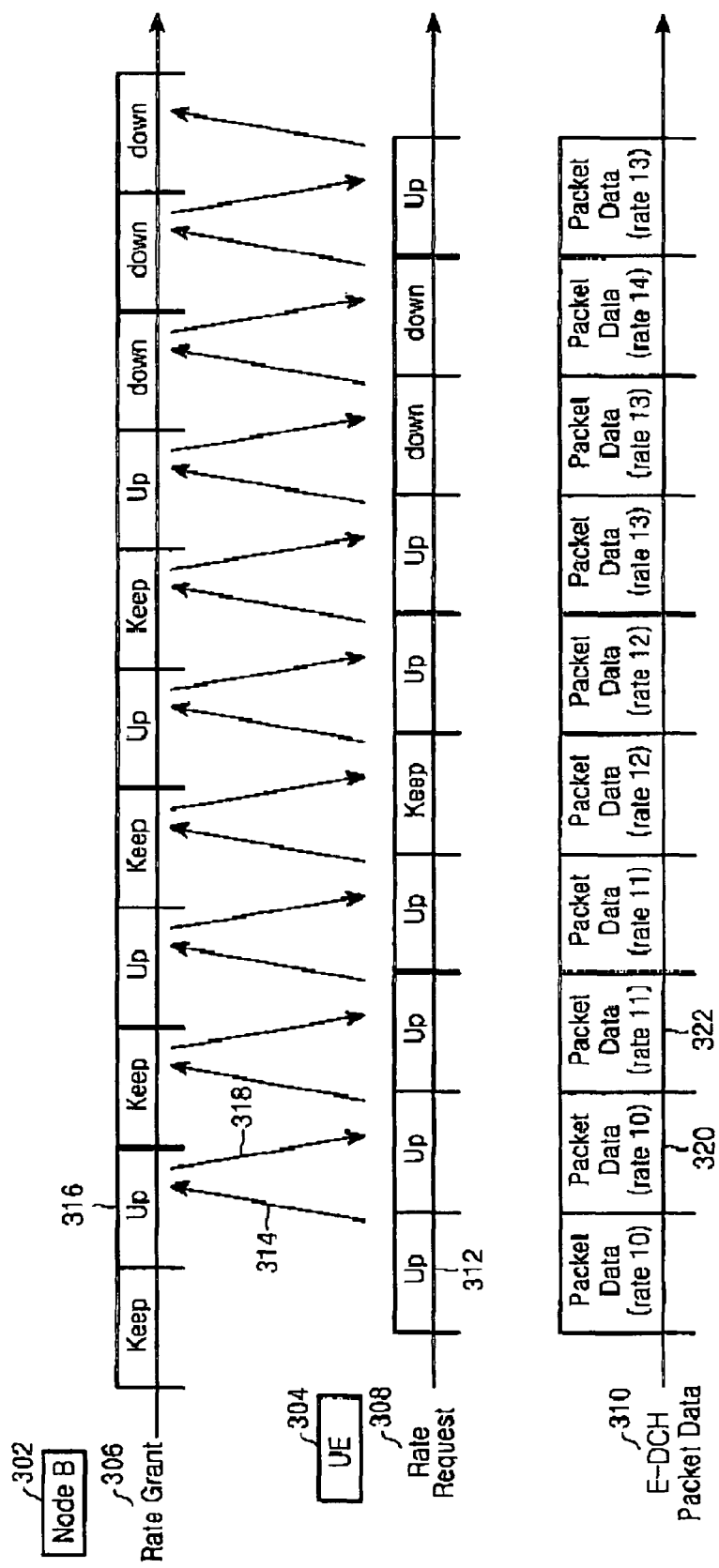
FIG. 5 illustrates transmission of UL/DL control information for rate scheduling, and UL rates controlled through the rate scheduling.
Figure 6:
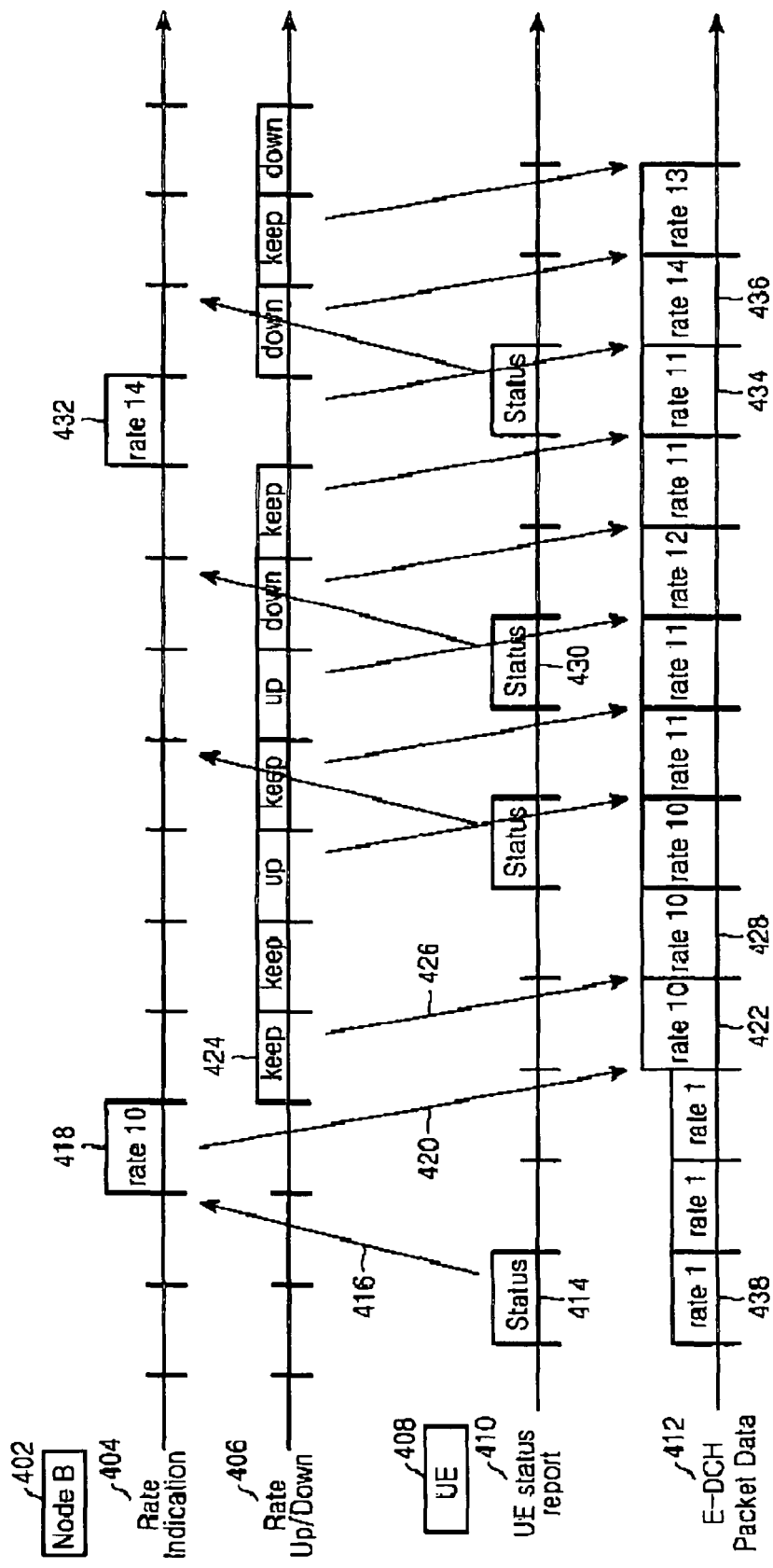
FIG. 6 illustrates transmission of rate assignment information which is determined through UL scheduling according to an embodiment of the present invention.

FIG. 6 illustrates transmission of rate assignment information which is determined through UL scheduling according to an embodiment of the present invention.

Referring to FIG. 6, a UE 408 transmits a UL packet 412 on the E-DCH to a Node B 402 which controls the scheduling of the UL packet transmission of the UE 408. DL control information used for scheduling is a Rate Indication 404 and a Rate Up/Down 406. UL control information for scheduling is a UE Status Report 410 that indicates the scheduling information of the UE 408.

To transmit an E-DCH packet, the UE 408 first transmits the UE Status Report 410 to the Node B 402. At the same time, the UE can transmit the E-DCH packet at a rate lower than a threshold (i.e. rate 1) without exchanging any information with the Node B 402.

The Node B 402 collects UE Status Reports from multiple UEs, determines rates for the individual UEs through scheduling, and transmits rate assignment information to the UE 408 and other USs (not shown). The rate assignment information is the Rate Indication 404 and the Rate Up/Down 406. If the rate of the UE 408 is to be changed by two or more levels, the Node B 402 directly instructs the UE 408 an assigned rate by the Rate Indication 404. On the other hand; if the rate is to be changed by one level or it is to be maintained, the Node B 402 commands the UE 408 to increase/decrease its rate by one level or maintain it by the Rate Up/Down 406.

The UE 408 transmits the UE Status Report 410 either periodically or upon the generation of new data in its buffer. Transmission upon generation of an event, such as the transmission of the UE Status Report 410 upon the generation of new data in the buffer, is referred to as event-triggered transmission.

More specifically, when the UE 408 transmits a UE Status Report 416 to the Node B 402 in an interval 414, the Node B 402 determines a rate for the UE 408 in an interval 418. If the determined rate is rate 10 and is two or more levels greater than the current rate of the UE 408, the Node B 402 instructs the UE 408 that the assigned rate is rate 10 by a Rate Indication 420. In an interval 422, the UE 408 transmits an E-DCH packet at rate 10 according to the Rate Indication 420.

In the next interval 424, the Node B 402 again determines a rate for the UE 408. If rate 10 is assigned, the Node B 402 tells the UE 408 that no change is made in the rate by a Rate Up/Down 426. Upon receipt of the Rate Up/Down 426, the UE transmits the E-DCH packet data at rate 10 in an interval 428. Thereafter, the UE 408 transmits the E-DCH packet data, while controlling its rate level by level or maintains the rate according to the Rate Up/Down 406.

When new data enters the buffer in an interval 430, the UE 408 transits the UE Status Report 410 to the Node B 402. In an interval 432, the Node B 402 needs to assign a much higher rate, e.g., rate 14, and thus transmits to the UE 408 the Rate Indication 406 indicating rate 14. Hence, the UE 408 transmits the E-DCH packet data at rate 14 two or more levels higher than rate 11 in an interval 436.

Hereinbelow, a description will be made of a procedure and apparatus for transmitting/receiving rate assignment information in a rate scheduling accompanied by fast rate ramping.

Figure 7:
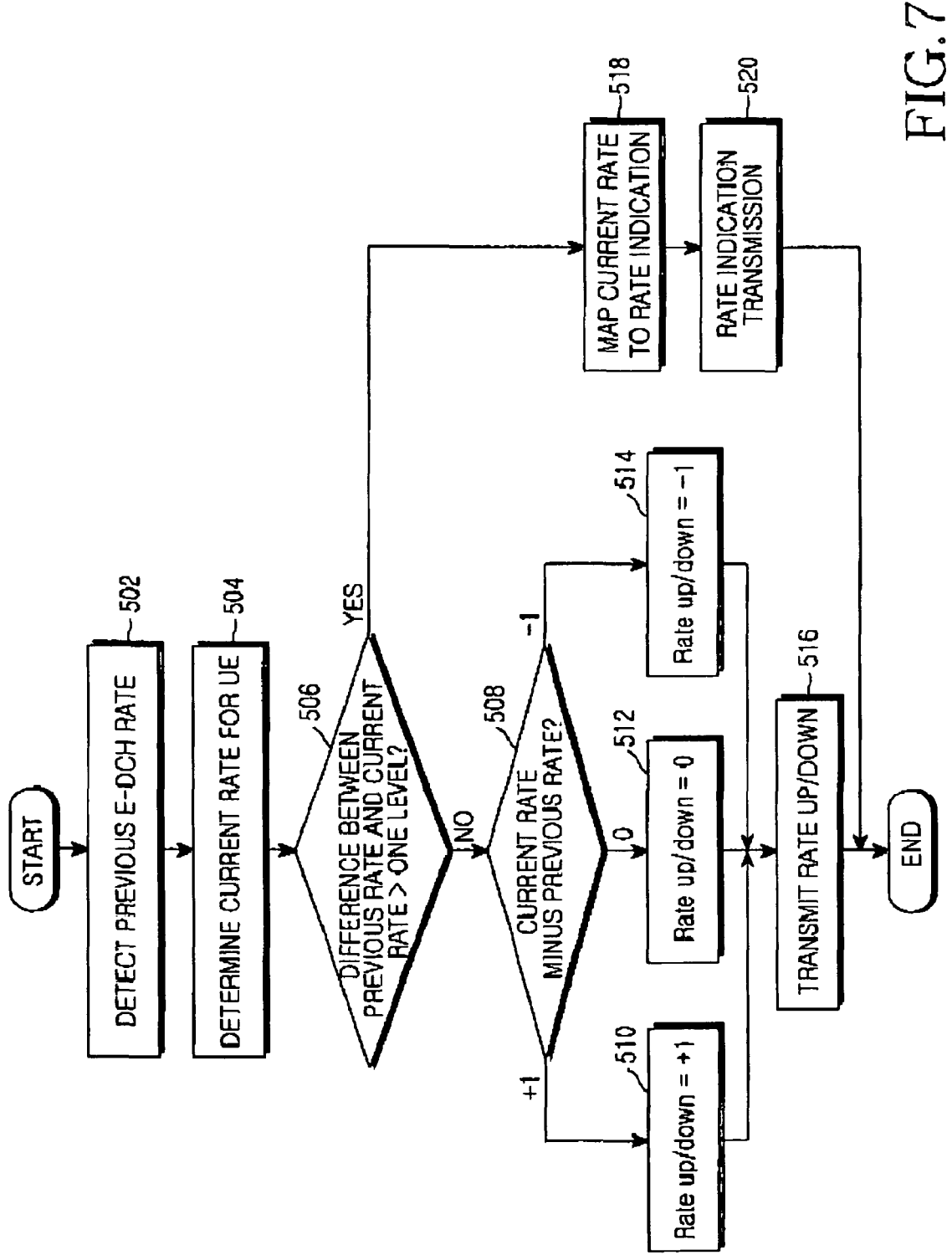
FIG. 7 is a flowchart illustrating an operation for transmitting the rate assignment information in a Node B according to the embodiment of the present invention.

FIG. 7 is a flowchart illustrating an operation for transmitting the rate assignment information in a Node B according to the embodiment of the present invention. The Node B determines whether to transmit a Rate Indication or a Rate up/Down and assigns a rate to the UE by the determined rate assignment information.

Referring to FIG. 7, the Node B detects in step 502 the rate of the E-DCH used in the previous interval and determines in step 504 a rate to assign to the UE by scheduling. In step 506, the Node B compares the previous rate with the determined current rate. If the difference between the two rates is two or more levels, the Node B maps the current rate to a Rate Indication referring to a pre-stored rate table and transmits to the UE in step 520 the Rate Indication.

If the difference between the two rates is zero or one level, the Node B compares the two rates again to transmit a Rate Up/Down to the UE in step 508. If the current rate is higher than the previous rate, the Node B goes to step 510. If the current rate is lower than the previous rate, the Node B goes to step 514. If the current rate is equal to the previous rate, the Node B goes to step 512.

In step 510, 512 or 514, the Node B maps the current rate to a Rate Up/Down. More specifically, the Node B maps the rate to rate up, for example, "+1" in step 510, to rate maintenance, for example, "0" in step 512, and to rate down, for example, "−1" in step 514. The Node B transmits the Rate Up/Down to the UE in step 516.

Figure 8:
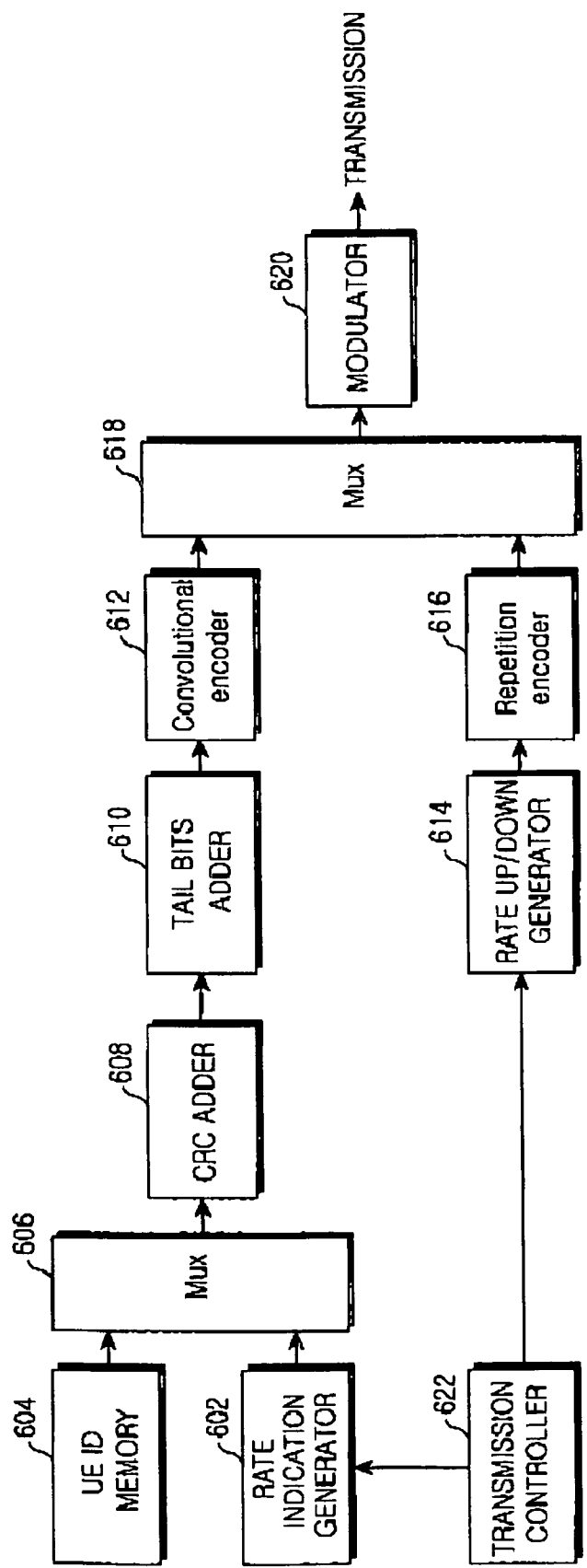
FIG. 8 is a block diagram of an apparatus for transmitting the rate assignment information determined by UL scheduling in the Node B according to the embodiment of the present invention.

FIG. 8 is a block diagram of an apparatus for transmitting the rate assignment information determined by UL scheduling in the Node B according to the embodiment of the present invention.

Referring to FIG. 8, a transmission controller 622 determines whether to transmit a Rate Indication or a Rate Up/Down for every transmission interval in the procedure illustrated in FIG. 7 and provides the determination result to a Rate Indication generator 602 and a Rate Up/Down generator 614. The Rate Indication generator 602 generates a Rate Indication for the UE in intervals 418 and 432 of FIG. 6. A multiplexer (MUX) 606 multiplexes the Rate Indication with the ID (Identifier) of the UE read from a UE ID memory 604. The multiplexed information is attached with a CRC in a CRC adder 608 and tail bits are added in a tail bits adder 610, and encoded in a convolutional encoder 612. Meanwhile, in intervals other than the intervals to transmit the Rate Indication, the Rate Up/Down generator 614 generates a Rate Up/Down. A repetition encoder 616 encodes the Rate Up/Down. A MUX 618 multiplexes the outputs of the convolutional encoder 612 and the repetition encoder 616. A modulator 620 modulates the output of the MUX 618 to a radio signal and transmits it in the air.

Figure 9:
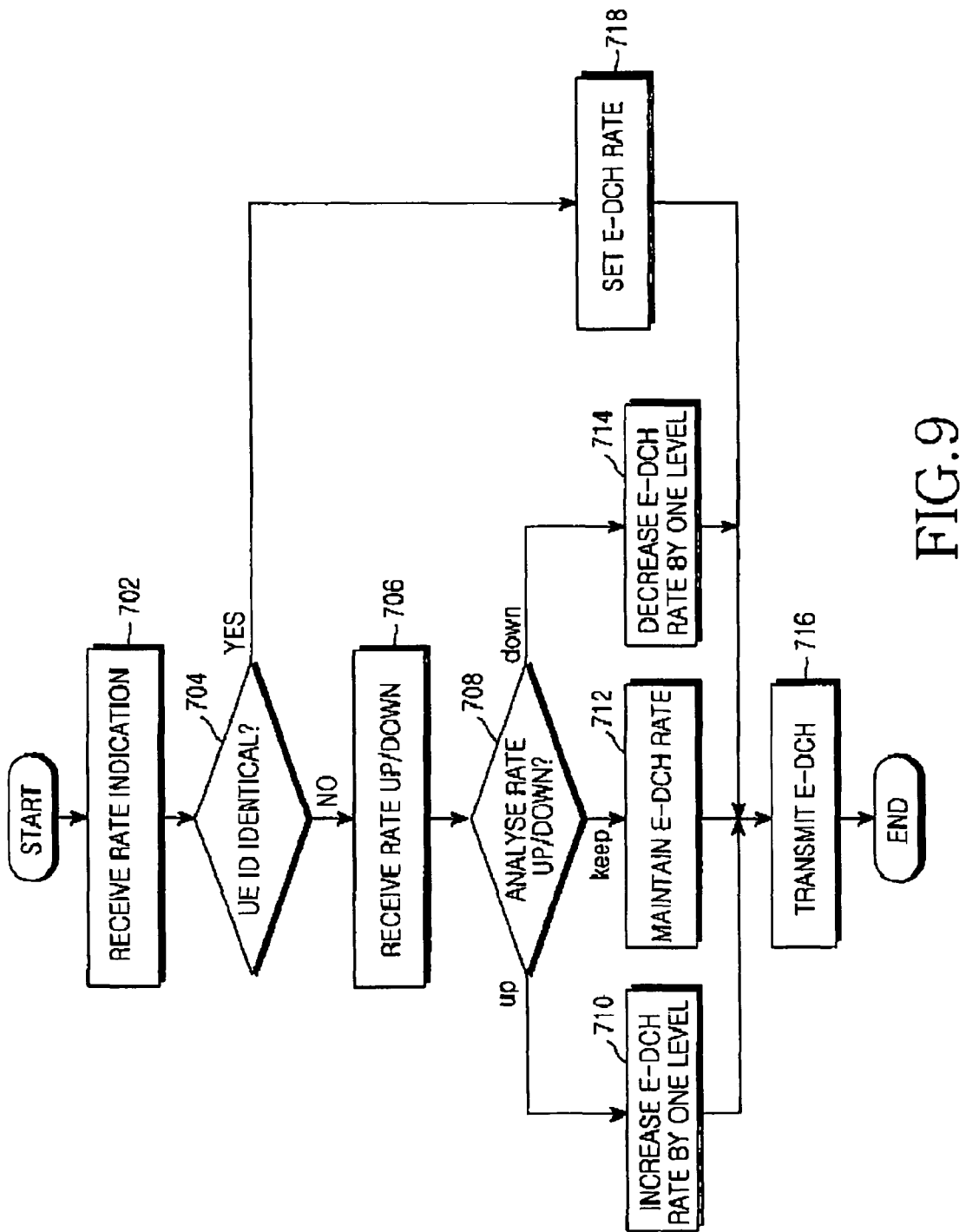
FIG. 9 is a flowchart illustrating an operation for receiving the rate assignment information determined by UL scheduling in a UE according to the embodiment of the present invention.

FIG. 9 is a flowchart illustrating an operation for receiving the rate assignment information determined by UL scheduling in the UE according to the embodiment of the present invention.

Referring to FIG. 9, the UE receives the Rate Indication from the Node B on a rate indication channel in step 702. In step 704, the UE acquires a UE ID from the Rate Indication and compares it with its ID to determine if the Rate Indication is destined for the UE. If they are identical, the UE sets a rate corresponding to the Rate Indication in a pre-stored rate table as the rate for the E-DCH in the current interval in step 718 and transmits in step 716 the E-DCH packet data at the rate.

On the contrary, if the UE IDs are different, the UE receives the Rate Up/Down on the rate indication channel in step 706. Also, in the absence of the Rate Indication in the rate indication channel, the UE receives the Rate Up/Down. In step 708, the UE interprets the Rate Up/Down. If the Rate Up/Down indicates rate up, the UE increases its rate by one level in step 710. If the Rate Up/Down indicates rate maintenance, the UE maintains its rate in step 712. If the Rate Up/Down indicates rate down, the UE decreases its rate by one level in step 714. In step 716, the UE transmits the E-DCH packet data at the controlled rate.

Figure 10:
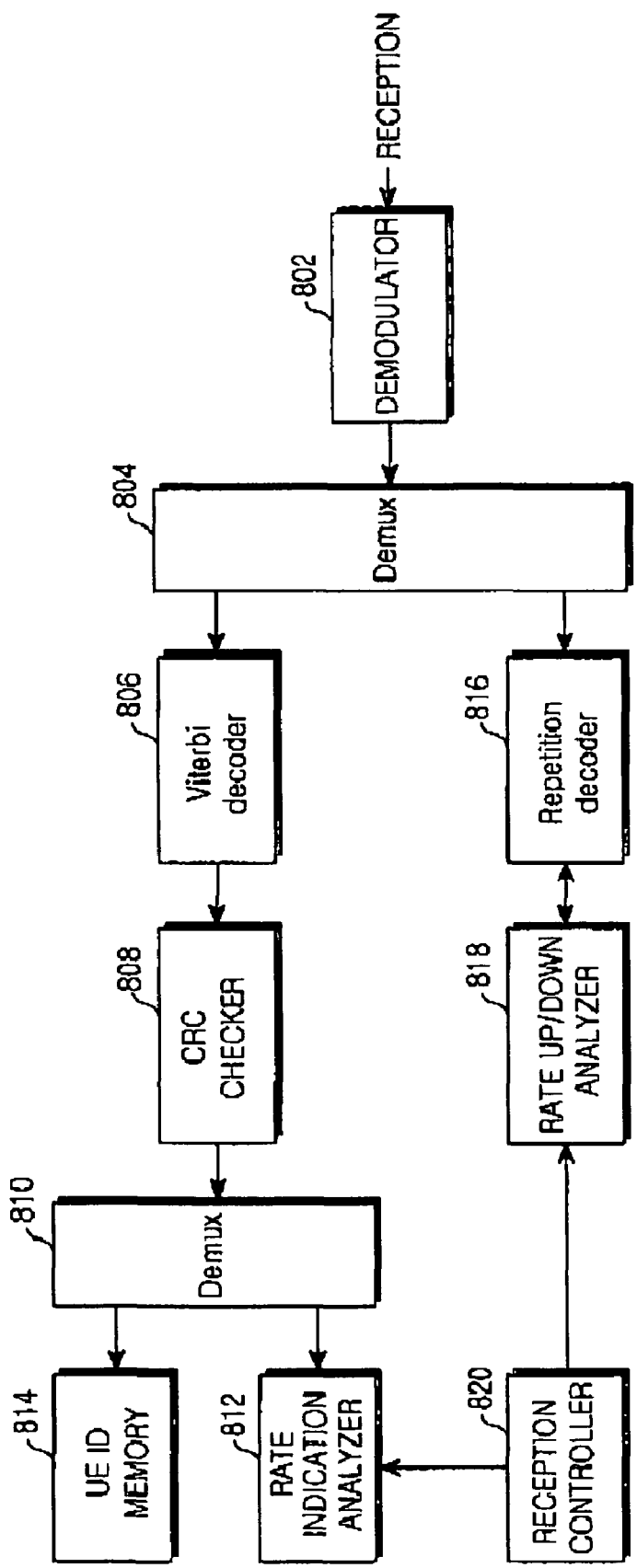
FIG. 10 is a block diagram of an apparatus for receiving the rate assignment information determined by UL scheduling in the UE according to the embodiment of the present invention.

FIG. 10 is a block diagram of an apparatus for receiving the rate assignment information determined by UL scheduling in the UE according to the embodiment of the present invention.

Referring to FIG. 10, a signal received on the rate indication channel is demodulated in a demodulator 802 and demultiplexed into a signal including the Rate Indication or a signal including the Rate Up/Down in a demultiplexer (DEMUX) 804.

A Viterbi decoder 806 decodes the Rate Indication-including signal. A CRC checker 808 detects a CRC from the decoded data. If the decoded data has no errors in a CRC check, the CRC checker 808 outputs the data except for the CRC to a DEMUX 810. The DEMUX 810 demultiplexes the output of the CRC checker 808 into the Rate Indication and a UE ID and provides them to a Rate Indication analyzer 812 and a UE ID memory 814, respectively. A reception controller 820 compares the extracted UE ID with the ID of the UE in every interval, determines whether the Rate Indication or the Rate Up/Down is to be received in the procedure illustrated in FIG. 9, and outputs the determination result to the Rate Indication analyzer 812 and a Rate Up/Down analyzer 818.

It can be further contemplated as another embodiment of the present invention that the CRC extracted in the CRC checker 808 is used as a UE ID. In this case, because a UE can be identified by a CRC, the CRC checker 808 outputs the Rate Indication directly without using the DEMUX 810.

If the extracted UE ID is identical to the ID of the UE, the Rate Indication analyzer 812 determines the current rate by analyzing the Rate Indication. If they are different, the Rate Up/Down-including signal is provided to a repetition decoder 816. The repetition decoder 816 decodes the received signal and outputs the Rate Up/Down to the Rate Up/Down analyzer 818. The Rate Up/Down analyzer 818 determines the current rate by controlling the previous rate according to the Rate Down/Up.

In accordance with the embodiment of the present invention, the UE first checks a UE ID in every interval to receive the Rate Indication. If the UE ID is identical to the ID of the UE, the UE reads the Rate Indication. If they are different, the UE reads the Rate Up/Down instead. Considering that the Rate Indication is transmitted only when a great change occurs to the rate of the UE, it is less frequent than the Rate Up/Down. Especially when a plurality of UEs transmit UL packets to one Node B, fast rate ramping that requires the transmission of the Rate Indication does not occur often in most cases. In this context, the checking of the UE ID to determine the presence or absence of the Rate Indication for the UE may become a constraint to the UE.

Therefore, the present invention can be implemented in other embodiments such that scheduling is performed more flexibly, while minimizing the constraint of acquiring of the Rate Indication by the UEs. This can be achieved by adaptively changing the transmission/reception timing of the rate assignment information according to situations.

In accordance with another embodiment of the present invention, the transmission of the Rate indication is limited to predetermined time intervals in order to relieve the UE of the constraint of receiving the Rate Indication. The UE checks a received UE ID during the predetermined intervals. If the read UE ID is identical to the ID of the UE, the UE reads the Rate Indication. If they are different, the UE reads the Rate Up/Down. In other intervals, the UE just checks the Rate Up/Down without the need for checking a received UE ID.

Figure 11:
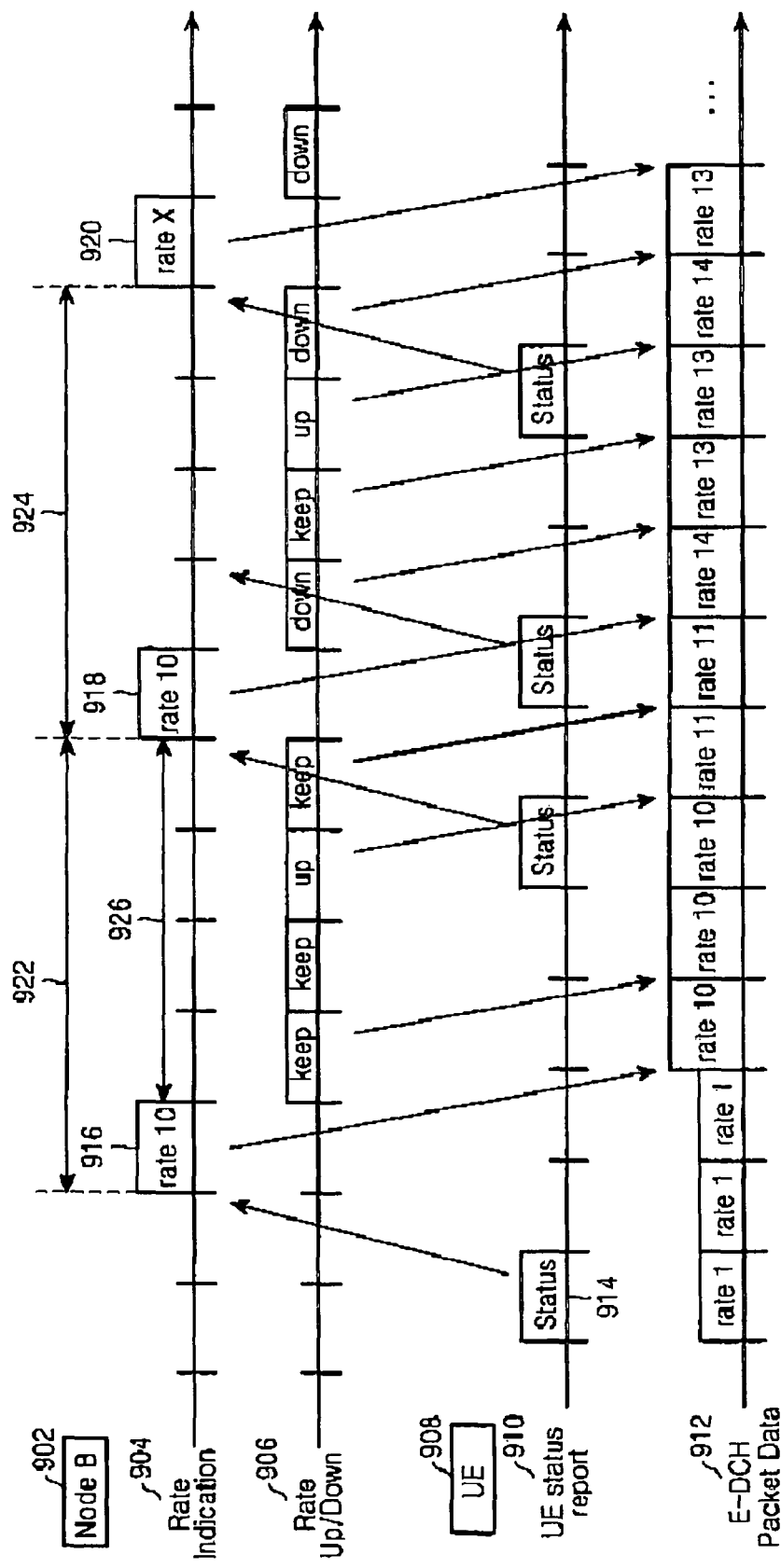
FIG. 11 is a conceptual view illustrating transmission of rate assignment information determined by UL scheduling according to another embodiment of the present invention.

FIG. 11 is a conceptual view illustrating transmission of rate assignment information determined by UL scheduling according to the second embodiment of the present invention.

Referring to FIG. 11, a Node B 902 assigns a UL rate for the E-DCH to a UE 908 through scheduling. To notify the UE 908 of the assigned UL rate, the Node B 902 uses a Rate Indication 904 or a Rate Up/Down 906. The UE 908 transmits periodically or in an event-triggered manner a UE Status Report 910 for use in scheduling to the Node B 902. It also transmits E-DCH packet data 912 at the assigned rate to the Node B 902. In the second embodiment of the present invention, the Node B 902 transmits the Rate Indication 904 to the UE 908 only in an interval 916 in which it receives the first UE Status Report 910 from the UE 908. Then, the Node B transmits the Rate Indication 904 every predetermined period of time indicated by reference numerals 922 and 924, for example, in intervals 918 and 920, while it transmits a Rate Up/Down 906 in the other intervals, for example, in a period 926.

If the Node B 902 determines that a rate can be assigned by the Rate Up/Down 906 in the intervals 916, 918 and 920, that is, if a rate change is only one level or no rate change is made, it transmits the Rate Up/Down 906 instead of the Rate Indication 904. The period of transmitting the Rate Indication 904 is fixed by the system or set by a control signal from a higher layer during a setup for UL packet transmission.

The operations of the Node B and the UE according to the second embodiment of the present invention will be described.

Figure 14:
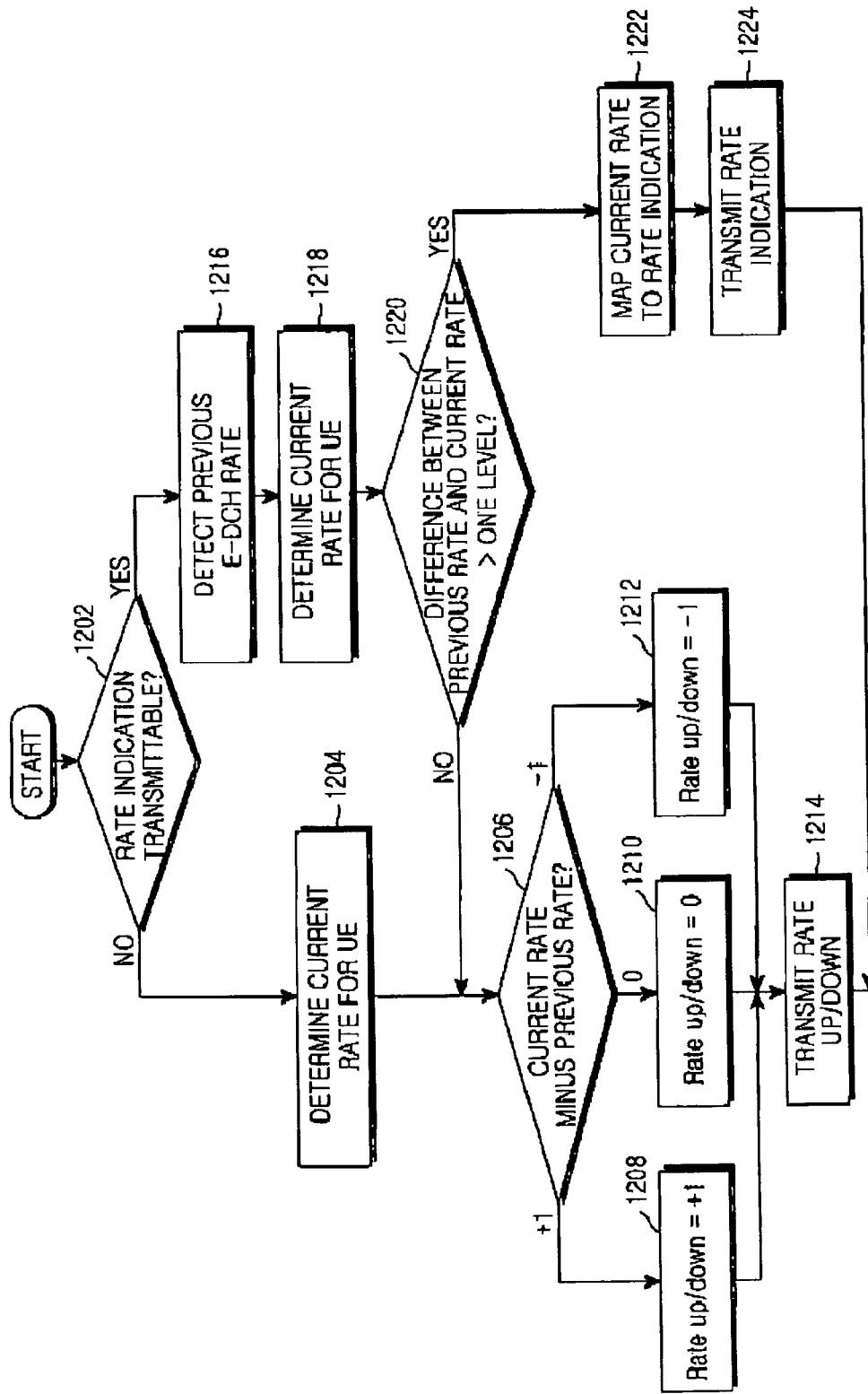
FIG. 14 is a flowchart illustrating an operation for transmitting the rate assignment information in the Node B according to the embodiment of the present invention.

FIG. 14 is a flowchart illustrating an operation for transmitting UL rate assignment information in the Node B according to the second embodiment of the present invention.

Referring to FIG. 14, the Node B determines to transmit the Rate Indication in the current interval by checking if the current interval is an interval predetermined for transmission of the Rate Indication in step 1202. In the second embodiment of the present invention, the Rate Indication is supposed to be transmitted every predetermined period of time after the start of communications.

If the Rate Indication is not scheduled to be transmitted in the current interval, the Node B determines a rate for the UE in the current interval in step 1204. The Node B sets the current rate for the UE so that it is different from the previous rate by one level or no change is made to the rate. In step 1206, the Node B compares the current rate with the previous rate. If the current rate is higher than the previous rate by one level, the Node B maps the Rate Up/Down to +1 in step 1208. If the current rate is equal to the previous rate, the Node B maps the Rate Up/Down to 0 in step 1210. If the current rate is lower than the previous rate by one level, the Node B maps the Rate Up/Down to -1 in step 1212. The Node B transmits the Rate Up/Down to the UE in step 1214.

If transmission of the Rate Indication is available in the current interval in step 1202, the Node B checks the previous rate in step 1216 and determines the current rate for the UE in step 1218. If the difference between the two rates is two or more levels in step 1220, the Node B goes to step 1222, otherwise, the process goes to step 1206. The Node B operates in the above-described manner in step 1206. Meanwhile, in step 1222, the Node B maps the current rate to the Rate Indication. Then the Node B transmits the Rate Indication to the UE in step 1224.

Figure 15:
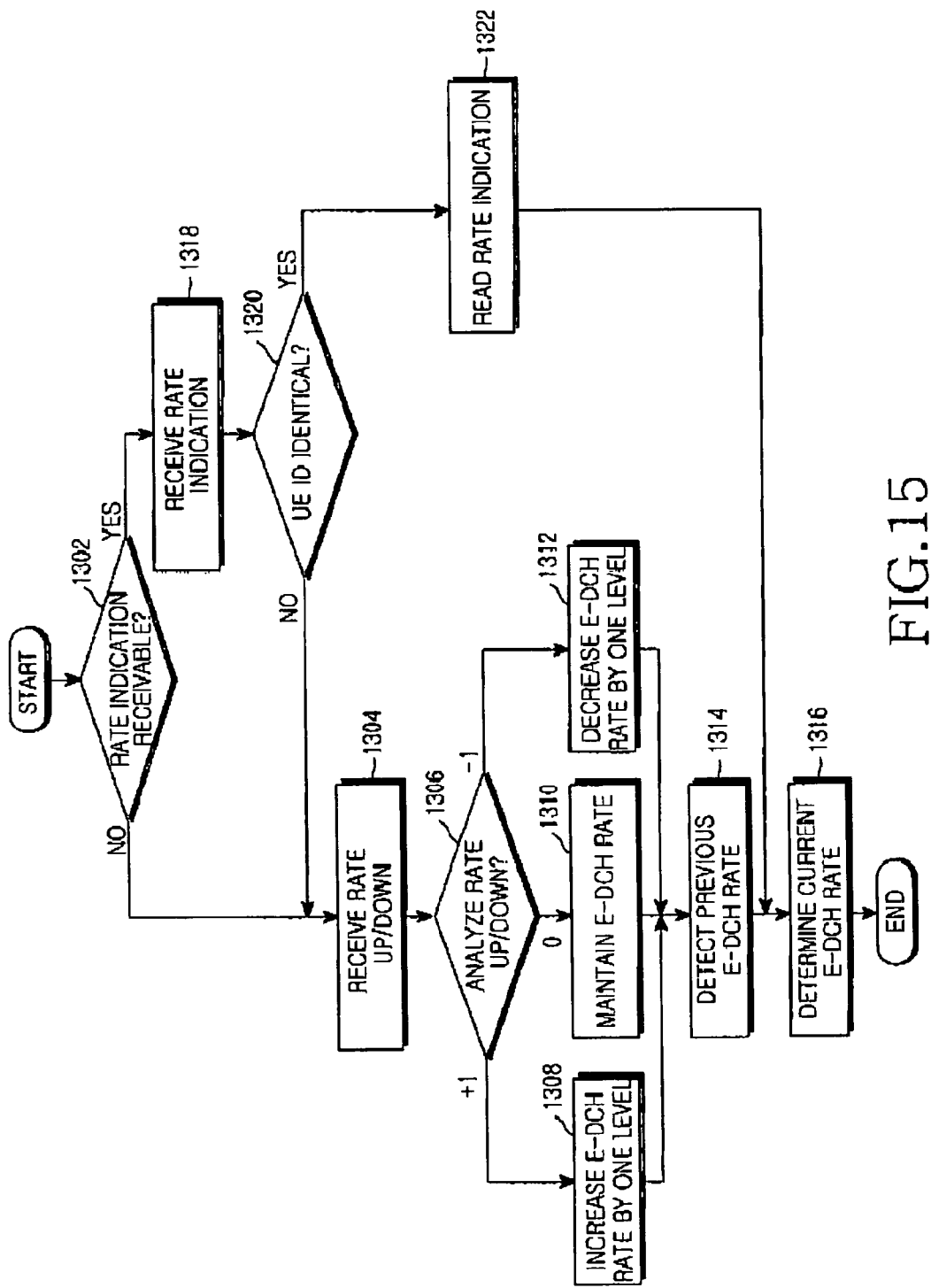
FIG. 15 is a flowchart illustrating an operation for receiving the rate assignment information in the UE according to the embodiment of the present invention.

FIG. 15 is a flowchart illustrating an operation for receiving the rate assignment information in the UE according to the second embodiment of the present invention.

Referring to FIG. 15, the UE determines if reception of the Rate Indication is available in the current interval by checking if the current interval is a predetermined interval for the reception of the Rate Indication in step 1302. The Rate Indication can be received every predetermined period of time after the start of communications. If the Rate Indication is not scheduled to be received in the current interval, the UE receives the Rate Up/Down in step 1304.

In step 1306, the UE analyzes the Rate Up/Down. If the Rate Up/Down is +1, indicating rate up, the UE determines that the current rate is higher than the previous rate by one level in step 1308. If the Rate Up/Down is 0, the UE determines that the current rate is equal to the previous rate in step 1310. If the Rate Up/Down is -1, the UE determines that the current rate is lower than the previous rate by one level in step 1312. In step 1314, the UE checks the previous rate. In step 1316, the UE sets the current rate according to the determination result of step 1308, 1310 or 1312 and the previous rate.

If reception of the Rate Indication is available in step 1302, the UE receives the Rate Indication in step 1318 and compares a UE ID received along with the Rate Indication with the ID of the UE in step 1320. If they are different, the UE determines the current rate according to the previous rate in the above-described manner in step 1304. If the UE IDs are identical, the UE reads the Rate Indication in step 1322 and determines the current rate based on the Rate Indication in step 1316.

In a third embodiment of the present invention, the Node B transmits the Rate Indication to the UE only if it receives the UE Status Report from the UE, in order to relieve the UE of the constraint of receiving the Rate Indication. Therefore, only when it transmits the UE Status Report to the Node B, the UE attempts to read the Rate Indication. During other times, the UE reads only the Rate Up/Down, knowing that there is no Rate Indication to receive.

Figure 12:
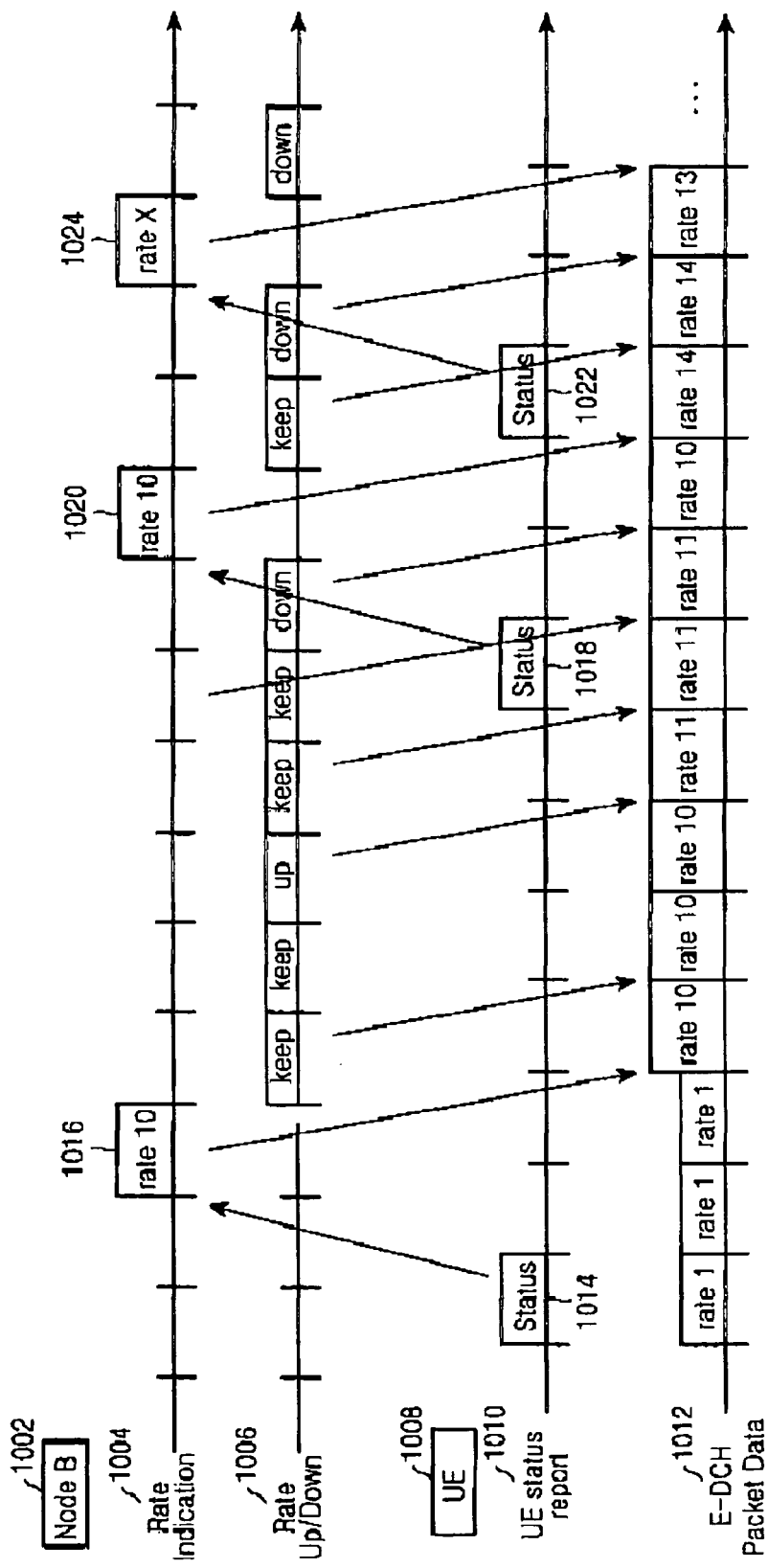
FIG. 12 is a conceptual view illustrating transmission of rate assignment information determined by UL scheduling according to a further embodiment of the present invention.

FIG. 12 is a conceptual view illustrating transmission of rate assignment information determined by UL scheduling according to the third embodiment of the present invention.

Referring to FIG. 12, a Node B 1002 assigns a UL rate for the E-DCH to a UE 1008 through scheduling. To notify the UE 1008 of the assigned UL rate, the Node B 1002 uses a Rate Indication 1004 or a Rate Up/Down 1006. The UE 1008 transmits periodically or in an event-triggered manner a UE Status Report 1010 for use in scheduling to the Node B 1002. It also transmits E-DCH packet data 1012 at the assigned rate to the Node B 1002.

In the third embodiment of the present invention, the Node B 1002 transmits the Rate Indication 1004 to the UE 1008 in intervals 1016, 1020 and 1024 in which it receives a UE Status Report 1010 transmitted in intervals 1014, 1018 and 1022 by the UE 1008. During other intervals, the Node B 1002 transmits a Rate Up/Down 1006. However, if a rate can be assigned to the UE 1008 by the Rate Up/Down 1006 in the intervals 1016, 1020 and 1024, that is, if a rate change is only one level or no rate change is made, the Node B transmits the Rate Up/Down 1006 instead of the Rate Indication 1004.

The operations of the Node B and the UE according to the third embodiment of the present invention will be described with reference to FIGS. 14 and 15.

FIG. 14 is a flowchart illustrating an operation for transmitting UL rate assignment information in the Node B according to the third embodiment of the present invention.

Referring to FIG. 14, the Node B determines to transmit the Rate Indication in the current interval by checking if the UE Status Report has been received in step 1202. In the third embodiment of the present invention, if the UE Status Report has been received within a predetermined period of time, the Node B determines that the Rate Indication can be transmitted in the current interval.

If the Rate Indication is not supposed to be transmitted in the current interval, the Node B determines a rate for the UE in the current interval in step 1204. The Node B sets the current rate for the UE so that it is different from the previous rate by one level or no change is made to the rate. In step 1206, the Node B compares the current rate with the previous rate. If the current rate is higher than the previous rate by one level, the Node B maps the Rate Up/Down to +1 in step 1208. If the current rate is equal to the previous rate, the Node B maps the Rate Up/Down to 0 in step 1210. If the current rate is lower than the previous rate by one level, the Node B maps the Rate Up/Down to −1 in step 1212. The Node B transmits the Rate Up/Down to the UE in step 1214.

On the other hand, if transmission of the Rate Indication is available in the current interval in step 1202, the Node B checks the previous rate in step 1216 and determines the current rate for the UE in step 1218. If the difference between the two rates is two or more levels in step 1220, the Node B goes to step 1222, otherwise, it goes to step 1206. The Node B operates in the afore-described manner in step 1206. Meanwhile, in step 1222, the Node B maps the current rate to the Rate Indication. Then the Node B transmits the Rate Indication to the UE in step 1224.

FIG. 15 is a flowchart illustrating an operation for receiving the rate assignment information in the UE according to the third embodiment of the present invention.

Referring to FIG. 15, the UE determines reception of the Rate Indication is available in the current interval by checking if it has transmitted the UE Status Report in step 1302. If it has transmitted the UE Status Report within a predetermined period of time, the UE determines that it can receive the Rate Indication in the current interval. If the Rate Indication is not scheduled to be received in the current interval, the UE receives the Rate Up/Down in step 1304.

In step 1306, the UE analyzes the Rate Up/Down. If the Rate Up/Down is +1, indicating rate up, the UE determines that the current rate is greater than the previous rate by one level in step 1308. If the Rate Up/Down is 0, the UE determines that the current rate is equal to the previous rate in step 1310. If the Rate Up/Down is −1, the UE determines that the current rate is less than the previous rate by one level in step 1312. In step 1314, the UE checks the previous rate. In step 1316, the UE sets the current rate according to the determination result of step 1308, 1310 or 1312 and the previous rate.

If reception of the Rate Indication is available in step 1302, the UE receives the Rate Indication in step 1318 and compares a UE ID received along with the Rate Indication with the ID of the UE in step 1320. If they are different, the UE determines the current rate according to the previous rate in the afore-described manner in step 1304. If the UE IDs are identical, the UE determines the current rate based on the Rate Indication in step 1322.

In a fourth embodiment of the present invention, the Node B transmits the Rate Indication to the UE every predetermined period of time or if it receives the UE Status Report from the UE, in order to relieve the UE of the constraint of receiving the Rate Indication. That is, the Node B can transmit the Rate Indication when receiving the UE Status Report from the UE or in predetermined intervals. Therefore, the UE attempts to read the Rate Indication in corresponding intervals. In the other times, the UE reads only the Rate Up/Down, knowing that there is no Rate Indication to receive either where it has not transmitted the UE Status Report and or where the predetermined period of time has not elapsed.

Figure 13:
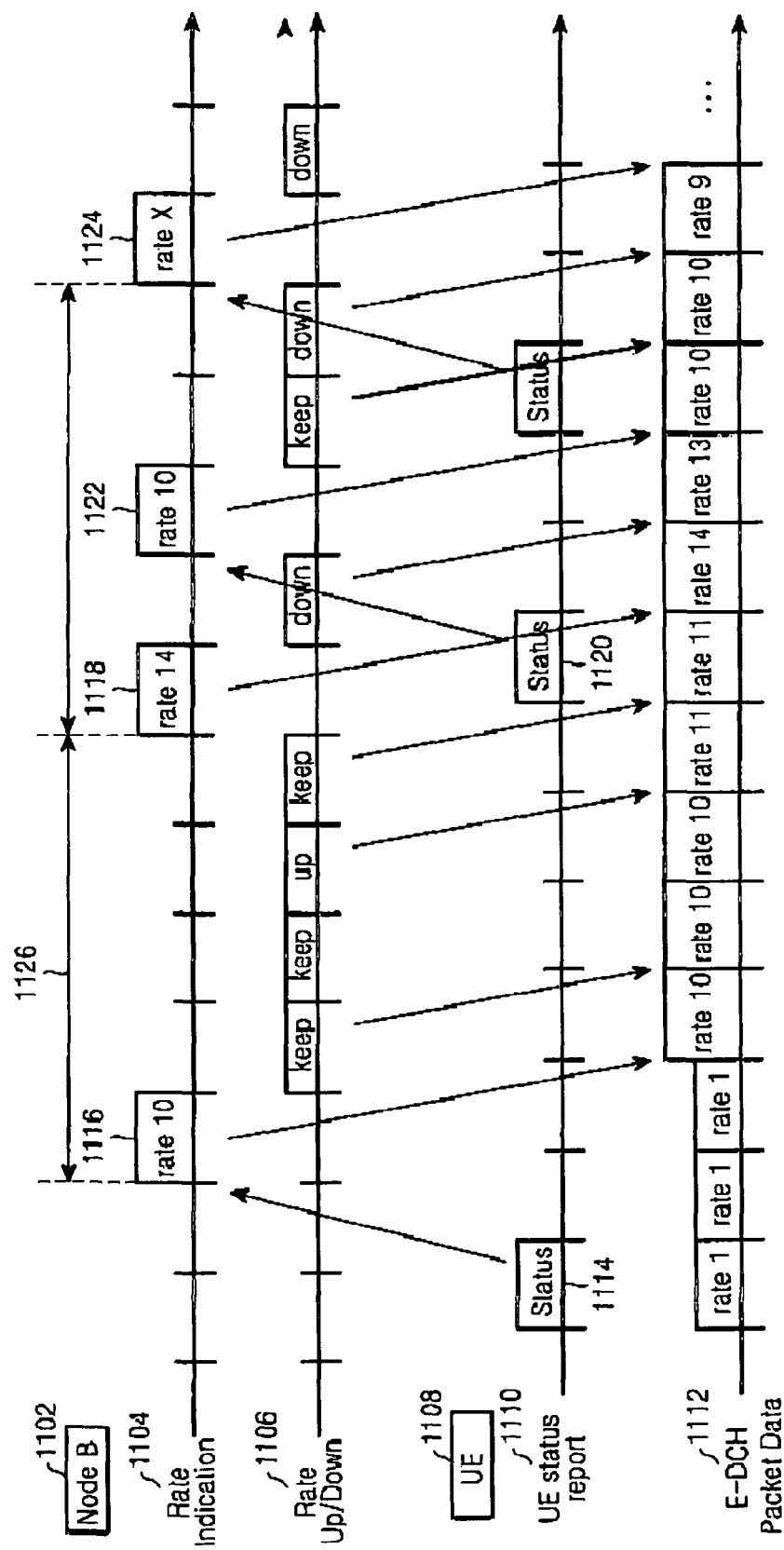
FIG. 13 is a conceptual view illustrating transmission of rate assignment information determined by UL scheduling according to yet another embodiment of the present invention.

FIG. 13 is a conceptual view illustrating transmission of rate assignment information determined by UL scheduling according to the fourth embodiment of the present invention.

Referring to FIG. 13, a Node B 1102 assigns a UL rate for the E-DCH to a UE 1108 through scheduling. To notify the UE 1108 of the assigned UL rate, the Node B 1102 uses a Rate Indication 1104 or a Rate Up/Down 1106. The UE 1108 transmits periodically or in an event-triggered manner a UE Status Report 1110 for use in scheduling to the Node B 1102. It also transmits E-DCH packet data 1112 at the assigned rate to the Node B 1102.

In the fourth embodiment of the present invention, the Node B 1102 transmits the Rate Indication 1104 to the UE 1108 when receiving the UE Status Report 1110 or every predetermined period of time. That is, the UE 1108 transmits the first UE Status Report 1110 to the Node B 1102 in an interval 1114 to start UL packet transmission. The Node B 1102 then transmits the Rate Indication 1104 in response to the UE Statue Report 1110 in an interval 1116 to the UE 1108. Since then, the Node B 1102 repeatedly transmits the Rate Indication 1104 every predetermined period of time 1126 after the interval 1116. That is, the Node B 1102 can transmit the Rate Indication in intervals 1118 and 1124.

After starting packet transmission, the UE 1108 transmits the UE Status Report 1110 to the Node B 1102 in an interval 1120. The Node B 1102 transmits to the UE 1108 the Rate Indication 1104 in an interval 1122 in which it receives the UE Status Report 1110. That is, the Node B 1102 can transmit the Rate Indication 1104 to the UE 1108 when it receives the UE Status Report 1110 or every predetermined time of period 1126. In the other times, the Node B 1102 transmits the Rate Up/Down 1106 to the UE 1108.

However, if a rate can be assigned to the UE 1108 by the Rate Up/Down 1106 in the intervals 1116, 1118, 1122 and 1124, that is, if a rate change is only one level or no rate change is made, the Node B transmits the Rate Up/Down 1106 instead of the Rate Indication 1104. The period of transmitting the Rate Indication 1104 is fixed by the system or set by a control signal from a higher layer during a setup for UL packet transmission.

The operations of the Node B and the UE according to the fourth embodiment of the present invention will be described with reference to FIGS. 14 and 15.

FIG. 14 is a flowchart illustrating an operation for transmitting UL rate assignment information in the Node B according to the fourth embodiment of the present invention.

Referring to FIG. 14, the Node B determines to transmit the Rate Indication in the current interval by checking if the UE Status Report has been received or a predetermined time of period has elapsed in step 1202. In the fourth embodiment of the present invention, if it is time to transmit the Rate Indication according to the predetermined time of period, or the UE Status Report has been received, the Node B determines that the Rate Indication can be transmitted in the current interval. The Rate Indication is scheduled to be transmitted periodically the predetermined period of time after the start of communications, or when the UE Status Report is received within a predetermined previous interval.

If the Rate Indication is not scheduled to be transmitted in the current interval, the Node B determines a rate for the UE in the current interval in step 1204. The Node B sets the current rate for the UE so that it is different from the previous rate by one level or no change is made to the rate. In step 1206, the Node B compares the current rate with the previous rate. If the current rate is greater than the previous rate by one level, the Node B maps the Rate Up/Down to +1 in step 1208. If the current rate is equal to the previous rate, the Node B maps the Rate Up/Down to 0 in step 1210. If the current rate is less than the previous rate by one level, the Node B maps the Rate Up/Down to −1 in step 1212. The Node B transmits the Rate Up/Down to the UE in step 1214.

If transmission of the Rate Indication is available in the current interval in step 1202, the Node B checks the previous rate in step 1216 and determines the current rate for the UE in step 1218. If the difference between the two rates is two or more levels in step 1220, the Node B goes to step 1222. Otherwise, it goes to step 1206. The Node B operates in the afore-described manner in step 1206. Meanwhile, in step 1222, the Node B maps the current rate to the Rate Indication. Then the Node B transmits the Rate Indication to the UE in step 1224.

FIG. 15 is a flowchart illustrating an operation for receiving the rate assignment information in the UE according to the fourth embodiment of the present invention.

Referring to FIG. 15, the UE determines if reception of the Rate Indication is available in the current interval by checking if it has transmitted the UE Status Report or the current interval is an interval predetermined for reception of the Rate Indication in step 1302. The Rate Indication can be received every predetermined period of time after the start of communications. Also, if it has transmitted the UE Status Report within a predetermined period of time, the UE considers that it can receive the Rate Indication in the current interval. If the Rate Indication is not supposed to be received in the current interval, the UE receives the Rate Up/Down in step 1304.

In step 1306, the UE analyzes the Rate Up/Down. If the Rate Up/Down is +1, indicating rate up, the UE determines that the current rate is greater than the previous rate by one level in step 1308. If the Rate Up/Down is 0, the UE determines that the current rate is equal to the previous rate in step 1310. If the Rate Up/Down is −1, the UE determines that the current rate is less than the previous rate by one level in step 1312. In step 1314, the UE checks the previous rate. In step 1316, the UE sets the current rate according to the determination result of step 1308, 1310 or 1312 and the previous rate.

If reception of the Rate Indication is available in step 1302, the UE receives the Rate Indication in step 1318 and compares a UE ID received along with the Rate Indication with the ID of the UE in step 1320. If they are different, the UE determines the current rate according to the previous rate in the afore-described manner in step 1304. On the contrary, if the UE IDs are identical, the UE determines the current rate based on the Rate Indication in step 1322.

The structures of the transmitting apparatus in the BS illustrated in FIG. 8 and the receiving apparatus in the UE illustrated in FIG. 10 are common to the second, third and fourth embodiments of the present invention, except that the transmission controller 622 in the transmitting apparatus determines to transmit the Rate Indication using different criteria including a predetermined transmission time of period, presence or absence of the UE Status Report, and the difference between the previous and current rates according to the second, third and fourth embodiments of the present invention. The reception controller 820 in the receiving apparatus also determines if it can receive the Rate Indication using different criteria including UE ID matching, a predetermined reception period of time, and transmission or non-transmission of the UE Status Report according to the second, third and fourth embodiments of the present invention.

As described above, the present invention advantageously enables fast rate ramping through UL rate scheduling in an asynchronous WCDMA communication system using the E-DCH. Thus, scheduling becomes more flexible and the total system performance is improved. Furthermore, a UE is relieved of the constraint of monitoring a rate indication channel to receive a Rate Indication.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting uplink rate assignment information to a user equipment (UE) in a Node B in a packet communication system that assigns uplink rates through Node B controlled scheduling, comprising the steps of:
   determining a current rate for an uplink channel for a UE that is implementing an uplink packet data service;
   comparing the current rate with a previous rate of the uplink channel;
   transmitting to the UE a rate indication directly indicating the current rate, if the difference between the current rate and the previous rate is more than one level; and
   transmitting to the UE a rate up/down indicating a rate change from the previous rate to the current rate if the difference between the current rate and the previous rate is one of zero and one level.

2. The current rate determining step of claim 1, comprising the step of selecting a level corresponding to the current rate in a rate table having a plurality of available uplink rates at a plurality of levels.

3. The rate indication transmitting step of claim 1, comprising the step of multiplexing the rate indication with the identifier (ID) of the UE.

4. The rate indication transmitting step of claim 1, comprising the steps of:
   multiplexing the rate indication with the ID of the UE;
   adding error correction information for the rate indication to the multiplexed data;
   adding tail bits to the error correction information-having data;
   convolutionally encoding the tail bits-having data; and
   modulating the convolutionally coded data and transmitting the modulated data on a rate indication channel.

5. The rate up/down transmitting step of claim 1, comprising the steps of:
   setting the rate up/down to rate up if the current rate is greater than the previous rate by one level;
   setting the rate up/down to rate maintenance if the current rate is equal to the previous rate; and
   setting the rate up/down to rate down if the current rate is less than the previous rate by one level.

6. The rate up/down transmitting step of claim 1, comprising the steps of:
   repeatedly encoding the rate up/down; and
   modulating the repetition-coded data and transmitting the modulated data on the rate indication channel.

7. A method of receiving uplink rate assignment information from a Node B in a user equipment (UE) in a packet communication system that assigns uplink rates through Node B controlled scheduling, comprising the steps of:
   receiving from the Node B a rate indication directly indicating an uplink rate and a UE identifier (ID);

determining a current rate for an uplink channel used for an uplink packet data service according to the rate set in the rate indication, if the UE ID is identical to the ID of the UE;

receiving a rate up/down from the Node B if the UE ID is different from the ID of the UE; and changing a previous rate of the uplink channel by at least one of one level and maintaining the previous rate according to the rate up/down and determining the changed or maintained rate as the current rate of the uplink channel.

8. The step of determining the current rate according to the rate indication of claim 7, comprising the step of selecting a rate corresponding to the rate indication in a rate table having a plurality of uplink rates at a plurality of levels.

9. The step of receiving the rate indication and the UE ID of claim 7, comprising the steps of:

demodulating a signal received on a rate indication channel;

extracting a signal including the rate indication by demultiplexing the demodulated signal;

Viterbi-decoding the rate indication-including signal;

Checking for errors in the Viterbi-decoded data; and extracting the rate indication and the UE ID by demultiplexing the error-checked data.

10. The step of determining the current rate according to the rate up/down of claim 7, comprising the steps of:

increasing the previous rate by one level and setting the increased rate as the current rate, if the rate up/down indicates rate up;

maintaining the previous rate as the current rate if the rate up/down indicates rate maintenance; and decreasing the previous rate by one level and setting the decreased rate as the current rate, if the rate up/down indicates rate down.

11. The rate up/down receiving step of claim 7, comprising the steps of:

demodulating a signal received on the rate indication channel;

extracting a signal including the rate up/down by demultiplexing the demodulated signal; and extracting the rate up/down by repeatedly decoding the rate up/down-including signal.

12. A method of transmitting uplink rate assignment information to a user equipment (UE) in a Node B in a packet communication system that assigns uplink rates through Node B controlled scheduling, comprising the steps of:

determining a current rate for an uplink channel for a UE that is implementing an uplink packet data service;

determining if a rate indication directly indicating the current rate can be transmitted during a current interval;

comparing the current rate with a previous rate of the uplink channel, if the rate indication can be transmitted during the current interval;

transmitting the rate indication to the UE if the difference between the current rate and the previous rate is more than one level; and transmitting to the UE a rate up/down indicating a rate change from the previous rate to the current rate if the rate indication cannot be transmitted in the current interval or if the difference between the current rate and the previous rate is one of zero and one level.

13. The step of determining if the rate indication can be transmitted of claim 12, comprising the step of determining that the rate indication can be transmitted if the current interval is an interval set according to a predetermined transmission period of the rate indication.

14. The step of determining if the rate indication can be transmitted of claim 12, comprising the step of determining that the rate indication can be transmitted if a UE stratus report has been received from the UE within a predetermined time.

15. The step of determining if the rate indication can be transmitted of claim 12, comprising the step of determining that the rate indication can be transmitted if the current interval is an interval set according to the predetermined transmission period of the rate indication, or if the UE stratus report has been received from the UE within the predetermined time.

16. The current rate determining step of claim 12, comprising the step of selecting a level corresponding to the current rate in a rate table having a plurality of available uplink rates at a plurality of levels.

17. The rate indication transmitting step of claim 12, comprising the step of multiplexing the rate indication with the identifier (ID) of the UE.

18. The rate indication transmitting step of claim 12, comprising the steps of:

multiplexing the rate indication with the ID of the UE;

adding error correction information for the rate indication to the multiplexed data;

adding tail bits to the error correction information-having data;

convolutionally encoding the tail bits-having data; and modulating the convolutionally coded data and transmitting the modulated data on a rate indication channel.

19. The rate up/down transmitting step of claim 12, comprising the steps of:

setting the rate up/down to rate up if the current rate is greater than the previous rate by one level;

setting the rate up/down to rate maintenance if the current rate is equal to the previous rate; and setting the rate up/down to rate down if the current rate is less than the previous rate by one level.

20. The rate up/down transmitting step of claim 12, comprising the steps of:

repeatedly encoding the rate up/down; and modulating the repetition-coded data and transmitting the modulated data on the rate indication channel.

21. A method of receiving uplink rate assignment information from a Node B in a user equipment (UE) in a packet communication system that assigns uplink rates through Node B controlled scheduling, comprising the steps of:

determining if a rate indication directly indicating a current uplink rate can be received during a current interval;

receiving the rate indication and a UE identifier (ID) from the Node B if the rate indication can be received;

determining the current rate according to the rate set in the rate indication if the UE ID is identical to the ID of the UE;

receiving a rate up/down from the Node B if the rate indication cannot be received or the UE ID is different from the ID of the UE; and changing a previous rate of the uplink channel by one level or maintaining the previous rate according to the rate up/down and setting changed or maintained rate as the current rate of the uplink channel.

22. The step of determining if the rate indication can be received of claim 21, comprising the step of determining that the rate indication can be received if the current interval is an interval set according to a predetermined reception period of the rate indication.

23. The step of determining if the rate indication can be received of claim 21, comprising the step of determining that the rate indication can be received if the UE has transmitted a UE stratus report to the Node B within a predetermined time.

24. The step of determining if the rate indication can be received of claim 21, comprising the step of determining that the rate indication can be received if the current interval is an interval set according to the predetermined reception period of the rate indication, or if the UE has transmitted the UE stratus report to the Node B within the predetermined time.

25. The step of determining the current rate according to the rate indication of claim 21, comprising the step of selecting a rate corresponding to the rate indication in a rate table having a plurality of uplink rates at a plurality of levels.

26. The step of receiving the rate indication and the UE ID of claim 21, comprising the steps of:
  demodulating a signal received on a rate indication channel;
  extracting a signal including the rate indication by demultiplexing the demodulated signal;
  Viterbi-decoding the rate indication-including signal;
  checking for errors in the Viterbi-decoded data; and
  extracting the rate indication and the UE ID by demultiplexing the error-checked data.

27. The step of determining the current rate according to the rate up/down of claim 21, comprising the steps of:
  increasing the previous rate by one level and determining the increased rate as the current rate, if the rate up/down indicates rate up;
  maintaining the previous rate as the current rate if the rate up/down indicates rate maintenance; and
  decreasing the previous rate by one level and determining the decreased rate as the current rate, if the rate up/down indicates rate down.

28. The rate up/down receiving step of claim 21, comprising the steps of:
  demodulating a signal received on the rate indication channel;
  extracting a signal including the rate up/down by demultiplexing the demodulated signal; and
  extracting the rate up/down by repeatedly decoding the rate up/down-including signal.

29. An apparatus for transmitting uplink rate assignment information to a user equipment (UE) in a Node B in a packet communication system that assigns uplink rates through Node B controlled scheduling, comprising:
  a transmission controller for determining if a rate indication can be transmitted during a current interval, the rate indication directly indicating a current rate for an uplink channel for a UE that is implementing an uplink packet data service;
  a rate indication generator for generating the rate indication if the rate indication can be transmitted during the current interval;
  a first transmitter for encoding the rate indication and transmitting the coded rate indication;
  a rate up/down generator for comparing the current rate with a previous rate of the uplink channel and generating a rate up/down indicating a rate change from the previous rate to the current rate if the rate indication cannot be transmitted in the current interval; and
  a second transmitter for encoding the rate up/down and transmitting the coded rate up/down.

30. The apparatus of claim 29, wherein the transmission controller determines that the rate indication can be transmitted if the difference between the current rate and the previous rate is more than one level.

31. The apparatus of claim 29, wherein the transmission controller determines that the rate indication can be transmitted if the current interval is an interval set according to a predetermined transmission period of the rate indication.

32. The apparatus of claim 30, wherein the transmission controller determines that the rate indication can be transmitted if a UE stratus report has been received from the UE within a predetermined time.

33. The apparatus of claim 30, wherein the transmission controller determines that the rate indication can be transmitted if at least one of the current interval is an interval set according to the predetermined transmission period of the rate indication, and the UE stratus report has been received from the UE within the predetermined time.

34. The apparatus of claim 29, wherein a level corresponding to the current rate is selected as the current rate from a rate table having a plurality of available uplink rates at a plurality of levels.

35. The apparatus of claim 29, wherein the first transmitter comprises:
  a multiplexer for multiplexing the rate indication with the ID of the UE;
  an error correction information adder for adding error correction information for the rate indication to the multiplexed data;
  a tail bits adder for adding tail bits to the error correction information-having data; and
  a convolutional encoder for convolutionally encoding the tail bits-having data.

36. The apparatus of claim 29, wherein the rate up/down generator sets the rate up/down to rate up if the current rate is greater than the previous rate by one level, sets the rate up/down to rate maintenance if the current rate is equal to the previous rate, and sets the rate up/down to rate down if the current rate is less than the previous rate by one level.

37. The apparatus of claim 29, wherein the second transmitter comprises a repetition encoder for repeatedly encoding the rate up/down.

38. An apparatus for receiving uplink rate assignment information from a Node B in a user equipment (UE) in a packet communication system that assigns uplink rates through Node B controlled scheduling, comprising:
  a reception controller for determining if a rate indication directly indicating a current uplink rate can be received during a current interval;
  a first receiver for receiving the rate indication and a UE identifier (ID) from the Node B if the rate indication can be received;
  a rate indication analyzer for determining the current rate according to the rate set in the rate indication;
  a second receiver for receiving a rate up/down from the Node B, if at least one of the rate indication cannot be received and the UE ID is different from the ID of the UE; and
  a rate up/down analyzer for at least one of changing a previous rate of the uplink channel by one level or maintaining the previous rate according to the rate up/down and determining the changed and maintained rate as the current rate of the uplink channel.

39. The apparatus of claim 38, wherein the reception controller determines that the rate indication can be received if the UE ID received along with the rate indication is identical to the ID of the UE.

40. The apparatus of claim 39, wherein the reception controller determines that the rate indication can be received if the current interval is an interval set according to a predetermined reception period of the rate indication.

41. The apparatus of claim 39, wherein the reception controller determines that the rate indication can be received if the UE has transmitted a UE stratus report to the Node B within a predetermined time.

42. The apparatus of claim 39, wherein the reception controller determines that the rate indication can be received if the current interval is an interval set according to the predetermined reception period of the rate indication, or if the UE has transmitted the UE stratus report to the Node B within the predetermined time.

43. The apparatus of claim 38, wherein the rate indication analyzer selects as the current rate a rate corresponding to the rate indication in a rate table having a plurality of uplink rates at a plurality of levels.

44. The apparatus of claim 38, wherein the first receiver comprises:
   a Viterbi decoder for Viterbi-decoding a signal including the rate indication received on a rate indication channel;
   an error correction information checker for checking for errors in the Viterbi-decoded data; and
   a demultiplexer for extracting the rate indication and the UE ID by demultiplexing the error-checked data.

45. The apparatus of claim 38, wherein the rate up/down analyzer increases the previous rate by one level and determining the increased rate as the current rate, if the rate up/down indicates rate up, maintains the previous rate as the current rate if the rate up/down indicates rate maintenance, and decreases the previous rate by one level and determining the decreased rate as the current rate, if the rate up/down indicates rate down.

46. The apparatus of claim 38, wherein the second receiver comprises a repetition decoder for extracting the rate up/down by repeatedly decoding a signal including the rate up/down received on the rate indication channel.

* * * * *